(12) United States Patent
Ko

(10) Patent No.: US 8,730,589 B2
(45) Date of Patent: May 20, 2014

(54) IMAGE LENS WITH HIGH RESOLUTION AND SMALL DISTANCE

(75) Inventor: Chun-Cheng Ko, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 14 days.

(21) Appl. No.: 13/586,810

(22) Filed: Aug. 15, 2012

(65) Prior Publication Data
US 2014/0022648 A1    Jan. 23, 2014

(30) Foreign Application Priority Data

Jul. 17, 2012    (TW) .............................. 101125692 A

(51) Int. Cl.
*G02B 9/34* (2006.01)
*G02B 3/02* (2006.01)

(52) U.S. Cl.
USPC ............ 359/715; 359/771; 359/774; 359/708

(58) Field of Classification Search
CPC .............................................. G02B 9/34–9/64
USPC ........................... 359/708, 713–715, 754–783
See application file for complete search history.

(56) References Cited

U.S. PATENT DOCUMENTS

| 7,355,801 B2 * | 4/2008 | Chen et al. ..................... 359/715 |
| 7,826,149 B2 * | 11/2010 | Tang et al. ..................... 359/715 |
| 7,961,406 B2 * | 6/2011 | Tang et al. ..................... 359/715 |

* cited by examiner

*Primary Examiner* — Darryl J Collins
(74) *Attorney, Agent, or Firm* — Novak Druce Connolly Bove + Quigg LLP

(57) ABSTRACT

An image lens, in order from an object side to an image side thereof, includes a first lens including a first surface and a second surface, a second lens including a third surface and a fourth surface, a third lens including a fifth surface and a sixth surface, a fourth lens including a seventh surface and a eighth surface, and an image plane. The image lens satisfies the following formulas: $D/TTL>1.11$; $D/L>1.13$; $Z/Y>0.076$; wherein D is the maximum image diameter of the image plane; TTL is a total length of the image lens; L is a distance from an outermost edge of the eighth surface to an optical axis of the image lens; Z is a distance from a central point of the sixth surface to an outermost edge of the sixth surface; and Y is a distance from the outermost edge of the sixth surface to the optical axis.

12 Claims, 31 Drawing Sheets

IMAGE LENS WITH HIGH RESOLUTION AND SMALL DISTANCE

BACKGROUND

1. Technical Field

The present disclosure relates to lenses and, particularly, to an image lens with high resolution and compact size.

2. Description of Related Art

Image sensors are used to capture an image. A size of an image sensor, such as a complementary metal oxide semiconductor device (CMOS), decreases with development of technology. For proper matching with the image sensor, an image lens, which is essentially comprised of a number of lenses, should be able to meet requirements such as high resolution and small lens depth. However, the existing image lenses cannot meet these requirements, resulting in poor imaging.

Therefore, it is desirable to provide an image lens which can overcome the limitations described above.

DETAILED DESCRIPTION

Embodiments of the disclosure will now be described in detail with reference to the accompanying drawings.

Figure 1:
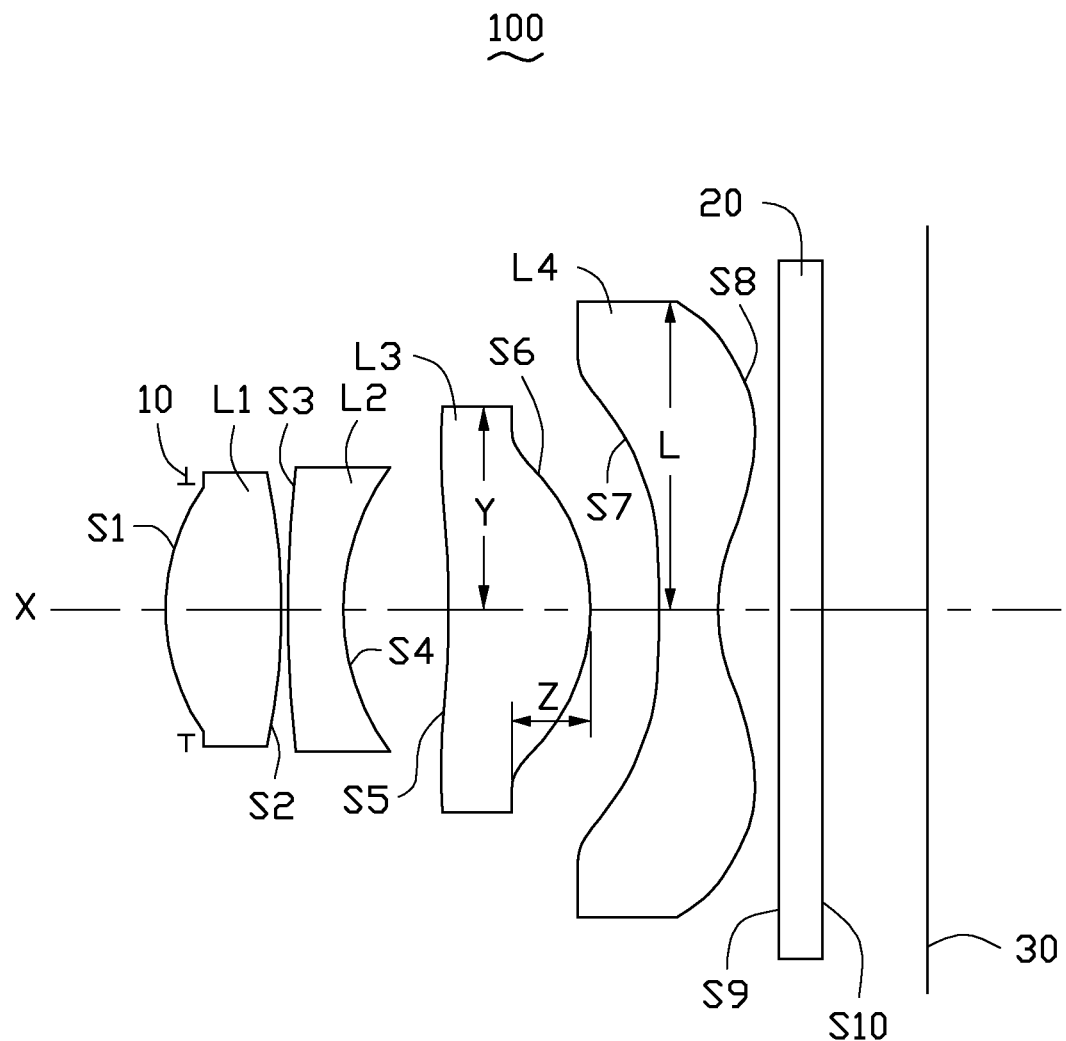
FIG. 1 is a schematic view of an image lens in accordance with the present disclosure.

FIG. 1 shows an image lens 100, according to an exemplary embodiment.

The image lens 100 includes, in order from the object side to the image side thereof, a first lens L1 with positive refraction power, a second lens L2 with negative refraction power, a third lens L3 with positive refraction power, a fourth lens L4 with negative refraction power, an anti-IR filter 20, and the image plane 30.

The first lens L1 includes a convex first surface S1 facing the object side and a convex second surface S2 facing the image side.

The second lens L2 includes a convex third surface S3 facing the object side and a concave fourth surface S4 facing the image side.

The third lens L3 includes a concave third surface S5 facing the object side and a convex sixth surface S6 facing the image side.

The fourth lens L4 includes a seventh surface S7 facing the object side and an eighth surface S8 facing the image side. In the embodiment, a portion of the seventh surface S7 close to an optical axis X of the image lens 100 is concave toward the object-side, and a portion of the eighth surface S8 close to the optical axis X of the image lens 100 is concave toward the image-side of the image lens 100.

The anti-IR filter 20 includes a ninth surface S9 facing the object side and a tenth surface S10 facing the image side.

The image lens 100 further includes an aperture stop 10. The aperture stop 10 is positioned on the object side of the first lens L1. Light rays enter the image lens 100, passing through the aperture stop 10, the first lens L1, the second lens L2, the third lens L3, the fourth lens L4, the anti-IR filter 20, finally forming optical images on the image plane 30. The aperture stop 10 is configured for adjusting light flux from the object side to the first lens L1. In addition, the aperture stop 10 facilitates uniform light transmission when light passes through the object side to correct chromatic aberrations of the image lens 100. The anti-IR filter 20 filters and removes infrared light from the light rays.

The image lens 100 satisfies the formulas:

$$D/TTL > 1.11; \quad (1)$$

$$D/L > 1.13; \quad (2)$$

$$Z/Y > 0.076; \quad (3)$$

wherein D is the maximum image diameter of the image plane 30; TTL is a total length of the image lens 100; L is a distance from an outermost edge of the eighth surface S8 to the optical axis X of the image lens 100 along a direction perpendicular to the optical axis X of the image lens 100; Z is a distance from a central point of the sixth surface S6 to an outermost edge of the sixth surface S6 along the optical axis X, Y is a distance from the outermost edge of the sixth surface S6 to the optical axis along a direction perpendicular to the optical axis X.

The formulas (1) to (2) are for shortening the depth of the image lens 100, and reducing the aberration of the field curvature and spherical aberration in the zoom process. If the image lens 100 does not satisfy the formulas (1) to (2), the depth of the image lens 100 cannot be maintained and the images captured by the image lens 100 cannot be corrected. Formula (3) is for properly distributing the refraction power, while maintaining a relatively small spherical aberration.

The image lens 100 further satisfies the formula:

$$0 < |R32/F3| < |R42/F4| < |R11/F1|; \quad (4)$$

wherein R11 is the curvature radius of the first surface S1 of the first lens L1; R32 is the curvature radius of the sixth surface S6 of the third lens L3; R42 is the curvature radius of the eighth surface S8 of the fourth lens L4; F1 is a focal length of the first lens L1, F3 is a focal length of the third lens L3, and F4 is a focal length of the fourth lens L4.

Formula (4) is for maintaining quality of images captured by the image lens 100. If the image lens 100 does not satisfy the formula (4), the images captured by the image lens 100 cannot be corrected.

The image lens 100 further satisfies the formula:

$$|R41/F4| > |R42/F4| > 0; \quad (5)$$

wherein R41 is the curvature radius of the seventh surface S7 of the fourth lens L4.

Formula (5) is for correcting chromatic aberration of the image lens 100. If the image lens 100 does not satisfy the formula (5), the images captured by the image lens 100 will have a greater chromatic aberration.

The image lens 100 further satisfies the formulas:

$$Vd1 > 53, Vd3 > 53, Vd4 > 53 \text{ and } Vd2 < 33; \quad (6)$$

wherein Vd1 is the Abbe number of the first lens L1; Vd2 is the Abbe number of the second lens L2; Vd3 is the Abbe number of the third lens L3, and Vd4 is Abbe number of the fourth lens L4.

When the conditions Vd1>53, Vd3>53, Vd4>53 and Vd2<33 are met, chromatic aberrations are effectively reduced and imaging performance is improved.

The first lens L1 further satisfies the formulas: 0<R11/F1<0.968; and −2.287<R12/F1<0, wherein R12 is the curvature radius of the second surface S2 of the first lens L1. The second lens L2 further satisfies the formulas: −4.074<R21/F2<0; and −0.648<R22/F2<0; wherein R21 is the curvature radius of the third surface S3 of the second lens L2; R22 is the curvature radius of the fourth surface S4 of the second lens L2; F2 is a focal length of the second lens L2. The third lens L3 further satisfies the formulas: −7.128<R31/F3<0; and −0.615<R32/F3<0, wherein R31 is the curvature radius of the fifth surface S5 of the third lens L3, and F3 is a focal length of the third lens L3. The fourth lens L4 further satisfies the formulas: −26.831<R41/F4<14.325, −0.695<R42/F4<0.

All of the first, second, third, fourth, fifth, sixth, seventh, and eighth surfaces S1, S2, S3, S4, S5, S6, S7, and S8, are aspherical surfaces. Each aspherical surface is shaped according to the formula:

$$Z = \frac{ch^2}{1 + \sqrt{1 - (k+1)c^2 h^2}} + \sum A_i h^i$$

wherein Z is the length of a line drawn from a point on the aspherical surface to the tangential plane of the aspherical surface, h is the height from the optical axis to the point on the aspherical surface, c is a vertex curvature (=1/R, the radius of curvature), k is a conic constant, and Ai is the correction coefficient, to the order of "i" of the aspherical surface.

Detailed examples of the image lens 100 are given below in addition to the information of FIGS. 2-31, but the image lens 100 is not to be limited by these examples. Listed below are the symbols used in these detailed examples:

FNo: F number;
2ω: field angle;
ri: radius of curvature of the surface Si;
Di: distance between surfaces on the optical axis of the surface Si and the surface Si+1;
Ni: refractive index of the surface Si;
Vi: Abbe constant of the surface Si;
Ki: Secondary curvature of the surface Si.

EXAMPLE 1

Tables 1-4 show a first embodiment of the image lens 100.

TABLE 1

| Surface | type | ri(mm) | Di(mm) | ni | Vi | ki |
|---|---|---|---|---|---|---|
| aperture stop 10 | standard | Infinity | −0.02 | — | — | — |
| first surface S1 | aspherical | 1.53 | 0.57 | 1.54 | 56.1 | −0.95 |
| second surface S2 | aspherical | −4.80 | 0.03 | — | — | — |

TABLE 1-continued

| Surface | type | ri(mm) | Di(mm) | ni | Vi | ki |
|---|---|---|---|---|---|---|
| third surface S3 | aspherical | 11.09 | 0.27 | 1.64 | 23.9 | — |
| fourth surface S4 | aspherical | 1.76 | 0.52 | — | — | −11.49 |
| fifth surface S5 | aspherical | −6.35 | 0.71 | 1.53 | 56 | 30.92 |
| sixth surface S6 | aspherical | −0.93 | 0.33 | — | — | −6.11 |
| seventh surface S7 | aspherical | −26.15 | 0.30 | 1.53 | 56.0 | — |
| eighth surface S8 | aspherical | 1.03 | 0.30 | — | — | −6.99 |
| ninth surface S9 | aspherical | Infinity | 0.21 | 1.52 | 54.5 | — |
| tenth surface S10 | aspherical | Infinity | 0.51 | — | — | — |
| image plane 20 | standard | — | — | — | — | — |

TABLE 2

| aspherical coefficient | first surface S1 | second surface S2 | third surface S3 | fourth surface S4 |
|---|---|---|---|---|
| A4 | 1.3E−03 | 0.0358 | −0.0108 | 0.2471 |
| A6 | 0.1068 | −0.0645 | −0.0946 | −0.4233 |
| A8 | −0.4539 | 0.3216 | 0.5746 | 0.7730 |
| A10 | 0.5299 | −0.6578 | −0.5004 | −0.4420 |
| A12 | −0.2224 | 0.2207 | −0.0885 | −0.0180 |

TABLE 3

| aspherical coefficient | fifth surface S5 |سixth surface S6 | seventh surface S7 | eighth surface S8 |
|---|---|---|---|---|
| A4 | 0.0888 | −0.3054 | −0.1530 | −0.1338 |
| A6 | −0.0869 | 0.6127 | −9.0E−03 | 0.0436 |
| A8 | 0.0332 | −0.7825 | 0.0374 | −0.0108 |
| A10 | 0.0601 | 0.5434 | −7.3E−03 | 1.4E−03 |
| A12 | −0.0259 | −0.1360 | −5.9E−05 | −1.2E−04 |

TABLE 4

| F(mm) | F/No | 2ω |
|---|---|---|
| 3.04 | 2.38 | 73.47° |

In the embodiment, D=4.544 mm; TTL=3.752 mm; Z=0.395 mm; Y=3.684 mm; L=1.210 mm; F1=2.193 mm; F2=−3.308 mm; F3=1.943 mm; F4=−1.838 mm.

Figure 2:
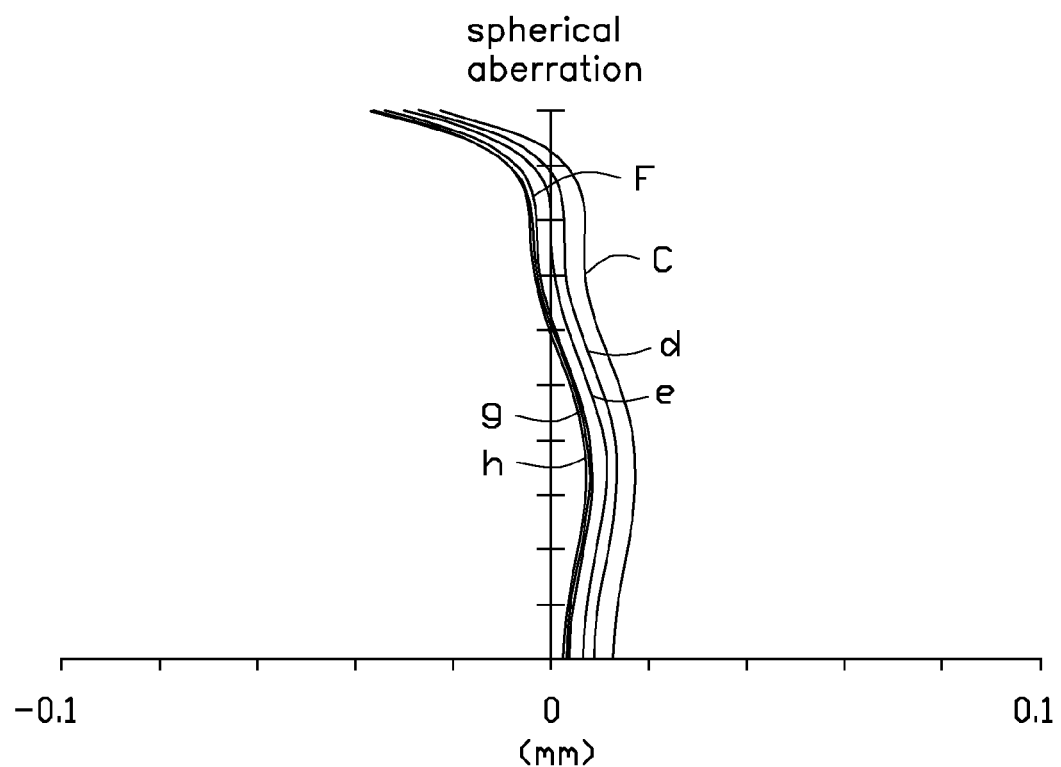
FIG. 2 is a graph showing characteristic curves of spherical aberration of the image lens of FIG. 1, in accordance with a first embodiment.
Figure 3:
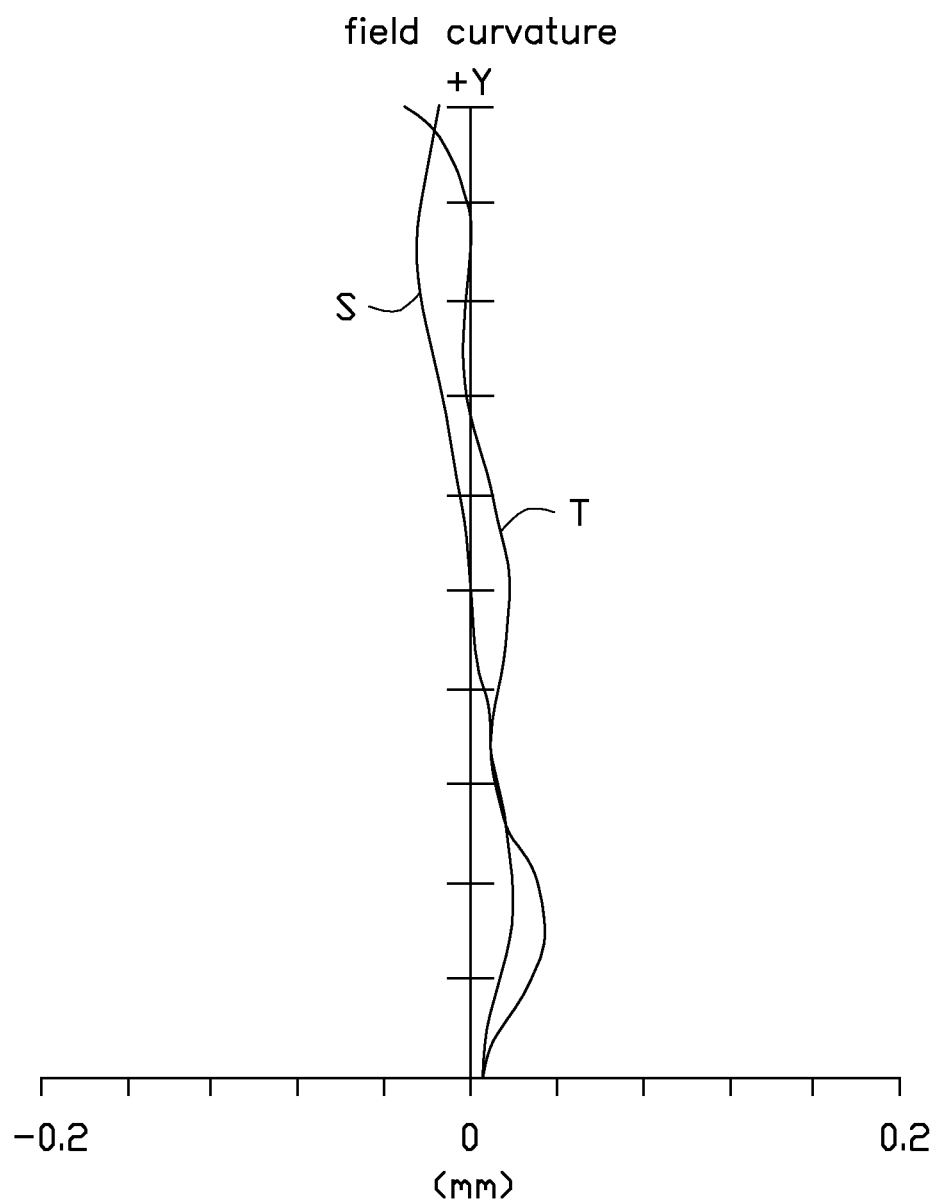
FIG. 3 is a graph showing characteristic curves of field curvature of the image lens of FIG. 1, in accordance with the first embodiment.
Figure 4:
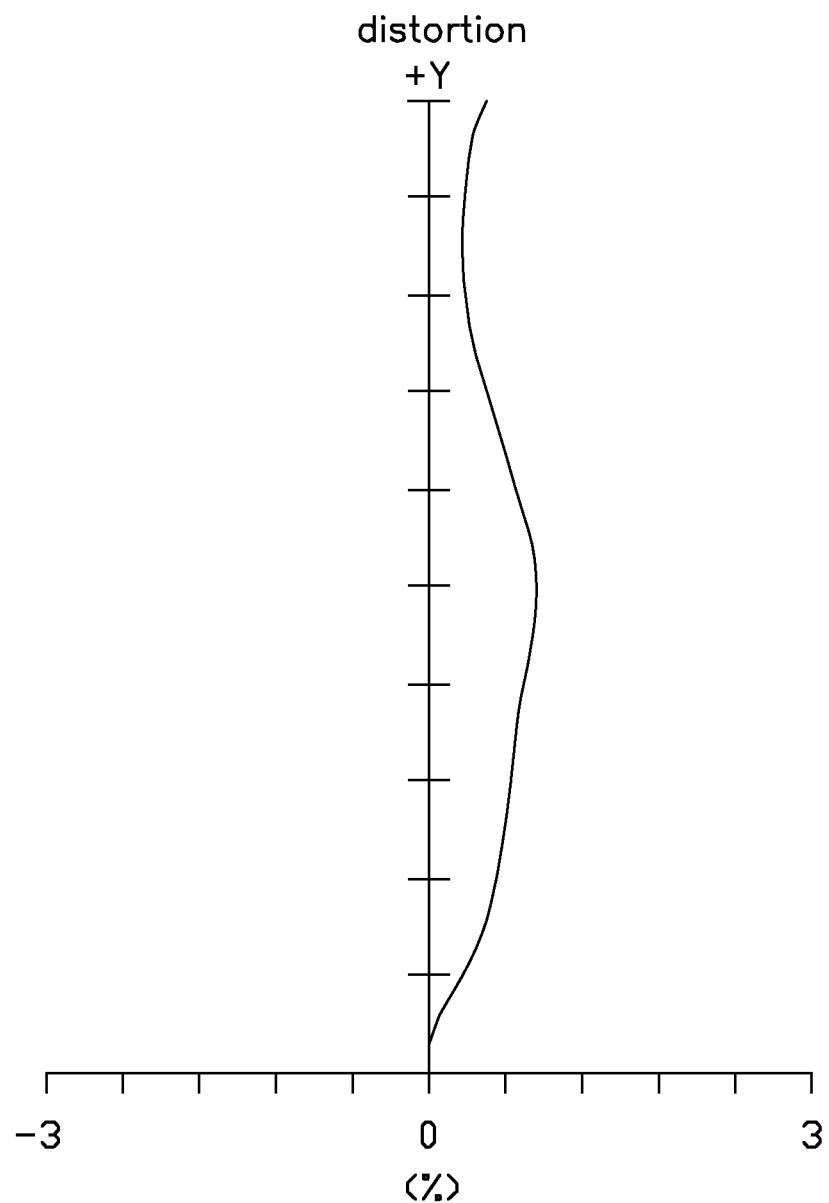
FIG. 4 is a graph showing characteristic curves of distortion of the image lens of FIG. 1 in accordance with the first embodiment.

FIGS. 2-4 are graphs of aberrations (spherical aberration, field curvature, and distortion) occurring in the first exemplary embodiment of the image lens 100. In FIG. 2, curves are spherical aberration characteristic curves of F light (wavelength: 486.1 nm), d light (wavelength: 587.6 nm), C light (wavelength: 656.3 nm) of the image system 100, e light (wavelength: 546.1 nm) of the image system 100, g light (wavelength: 435.8 nm) of the image system 100, h light (wavelength: 404.7 nm) of the image system 100. The spherical aberration of the image lens 100 of the first exemplary embodiment is from −0.10 mm to 0.10 mm. As illustrated in FIG. 3, the curves T and S are respectively the tangential field curvature curve and the sagittal field curvature curve. The field curvature of the first exemplary embodiment of the image lens 100 is from −0.20 mm to 0.20 mm. In FIG. 4, the distortion of the first exemplary embodiment of the image lens system 100 is from 0 to 3.00%.

Figure 5:
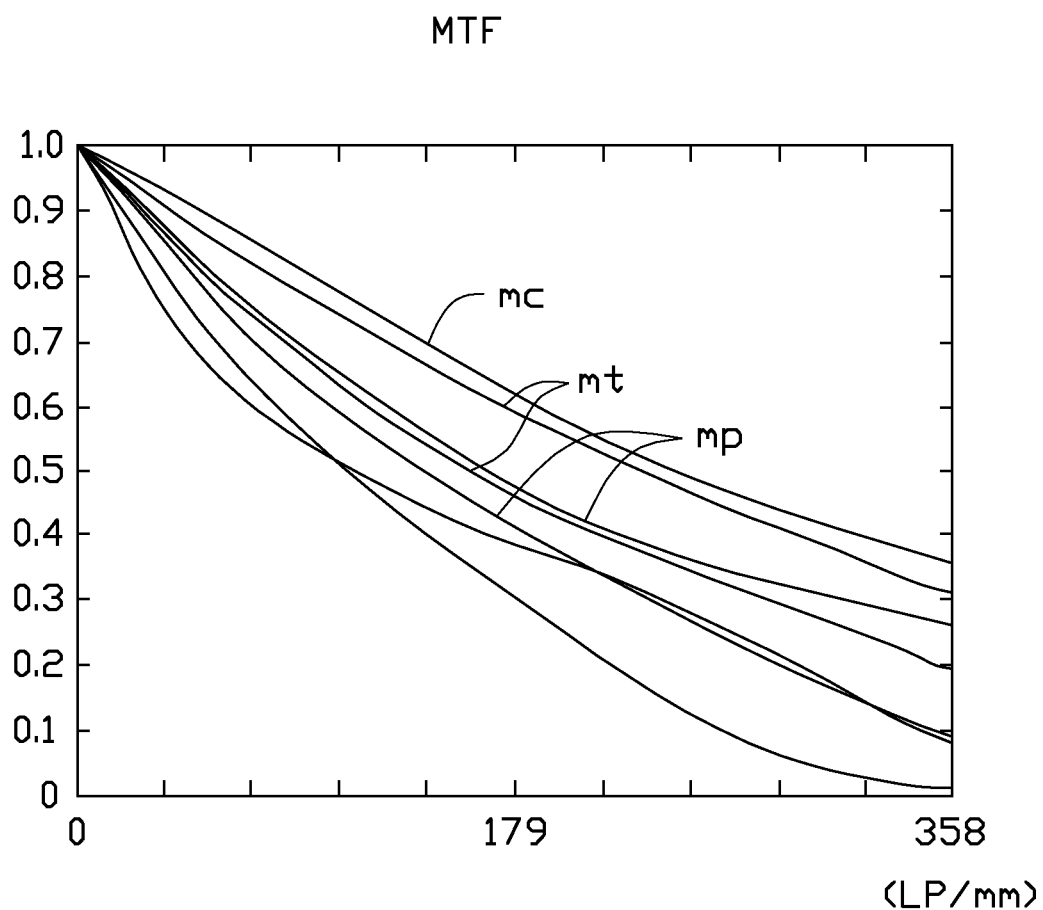
FIG. 5 is a graph showing characteristic curves of modulation transfer mode occurring in the image lens of FIG. 1 used in a telephoto mode, according to the first embodiment.

FIG. 5 is a graph showing characteristic curves of modulation transfer mode occurring in the image lens 100 which is in a telephoto mode, according to the first exemplary embodiment. As shown in FIG. 5, for half of the Nyquist frequency (about 179 lp/mm), the MTF of the central field is greater than 59% (see curve mc), the MTF of the 0.8 field is greater than 40% (see curve mp), the MTF between the central field and the 0.8 field is in a range of: 40%~59% (see curve mt, for example).

Figure 6:
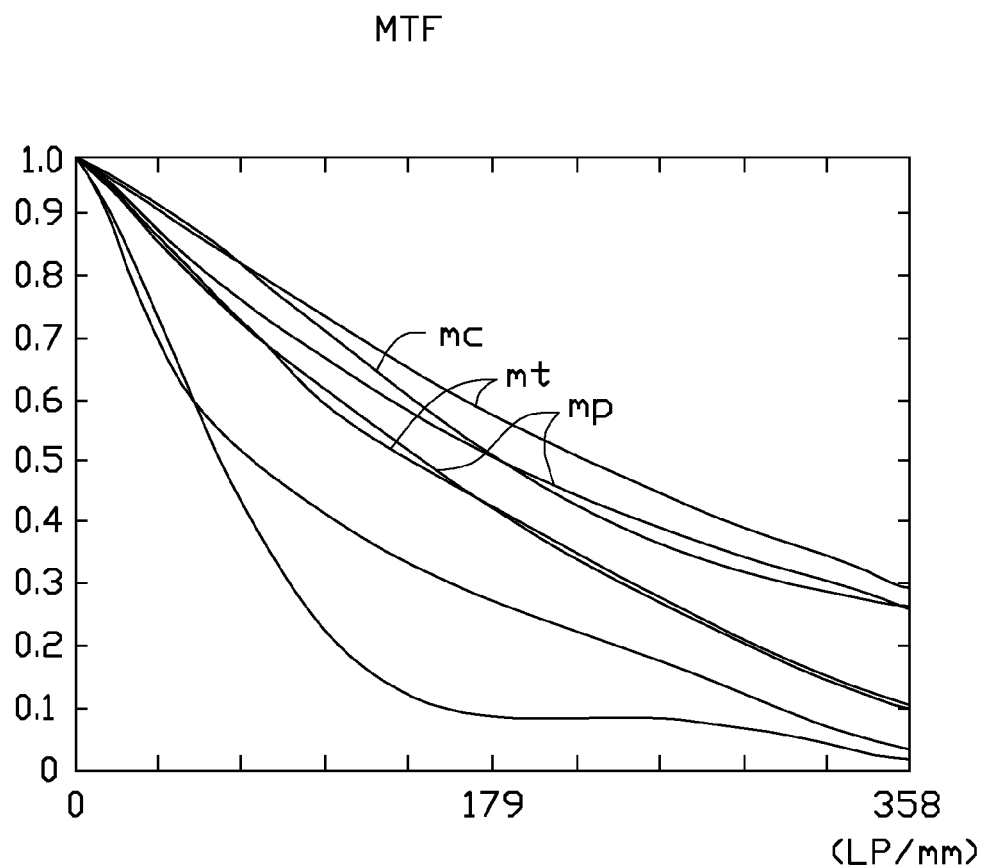
FIG. 6 is a graph showing characteristic curves of modulation transfer mode occurring in the image lens used in a wide-angle mode, according to the first embodiment.

FIG. 6 is a graph showing characteristic curves of modulation transfer mode occurring in the image lens 100 which is in a wide-angle mode, according to the first exemplary embodiment. As shown in FIG. 6, for half of the Nyquist frequency (about 179 lp/mm), the MTF of the central field is greater than 50% (see curve mc), the MTF of the 0.8 field is greater than 40% (see curve mp), the MTF between the central field and the 0.8 field is in a range of: 40%~50% (see curve mt, for example).

EXAMPLE 2

Tables 5-8 show a second embodiment of the image lens 100.

TABLE 5

| Surface | type | ri(mm) | Di(mm) | ni | Vi | ki |
|---|---|---|---|---|---|---|
| aperture stop 10 | standard | Infinity | 0.03 | — | — | — |
| first surface S1 | aspherical | 1.60 | 0.49 | 1.54 | 56.1 | −0.87 |
| second surface S2 | aspherical | −4.50 | 0.03 | — | — | — |
| third surface S3 | aspherical | 13.49 | 0.25 | 1.64 | 23.9 | — |
| fourth surface S4 | aspherical | 1.86 | 0.65 | — | — | −11.62 |
| fifth surface S5 | aspherical | −4.06 | 0.58 | 1.53 | 56.0 | 5.94 |
| sixth surface S6 | aspherical | −0.90 | 0.38 | — | — | −5.36 |
| seventh surface S7 | aspherical | 50.04 | 0.30 | 1.53 | 56.0 | — |
| eighth surface S8 | aspherical | 0.98 | 0.30 | — | — | −6.19 |
| ninth surface S9 | aspherical | Infinity | 0.21 | 1.52 | 54.5 | — |
| tenth surface S10 | aspherical | Infinity | 0.57 | — | — | — |
| image plane 20 | standard | — | — | — | — | — |

TABLE 6

| aspherical coefficient | first surface S1 | second surface S2 | third surface S3 | fourth surface S4 |
|---|---|---|---|---|
| A4 | −4.2E−03 | 0.0389 | 0.0229 | 0.2208 |
| A6 | 0.0524 | 0.0685 | −0.0899 | −0.4378 |
| A8 | −0.3847 | 0.0711 | 0.5673 | 0.8363 |
| A10 | 0.4464 | −1.0528 | −0.5307 | −0.4232 |
| A12 | −0.1836 | 0.7940 | −0.1807 | −0.1155 |

TABLE 7

| aspherical coefficient | fifth surface S5 | sixth surface S6 | seventh surface S7 | eighth surface S8 |
|---|---|---|---|---|
| A4 | 0.1218 | −0.2723 | −0.1083 | −0.1143 |
| A6 | −0.1054 | 0.6102 | −0.0186 | 0.0344 |
| A8 | 0.0362 | −0.7755 | 0.0310 | −8.2E−03 |
| A10 | 0.0506 | 0.5402 | −6.6E−03 | 1.0E−03 |
| A12 | −0.0267 | −0.1371 | 3.0E−04 | −7.6E−05 |

TABLE 8

| F (mm) | F/No | 2ω |
|---|---|---|
| 3.11 | 2.77 | 72.77° |

In the embodiment, D=4.544 mm; TTL=3.785 mm; Z=0.360 mm; Y=2.047 mm; L=3.788 mm; F1=2.218 mm; F2=−3.394 mm; F3=2.014 mm; F4=−1.872 mm.

Figure 7:
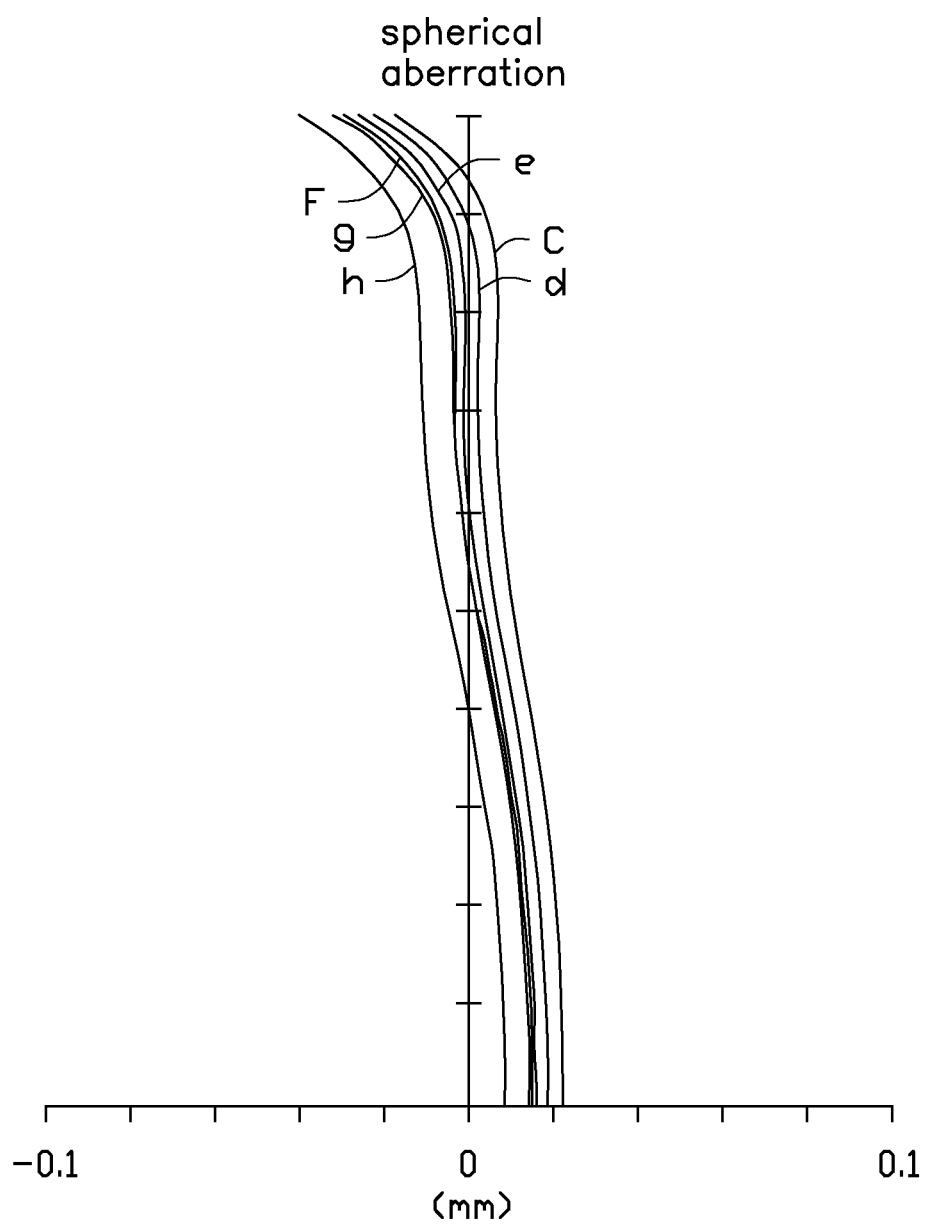
FIG. 7 is a graph showing characteristic curves of spherical aberration of the image lens of FIG. 1 in accordance with a second embodiment.
Figure 8:
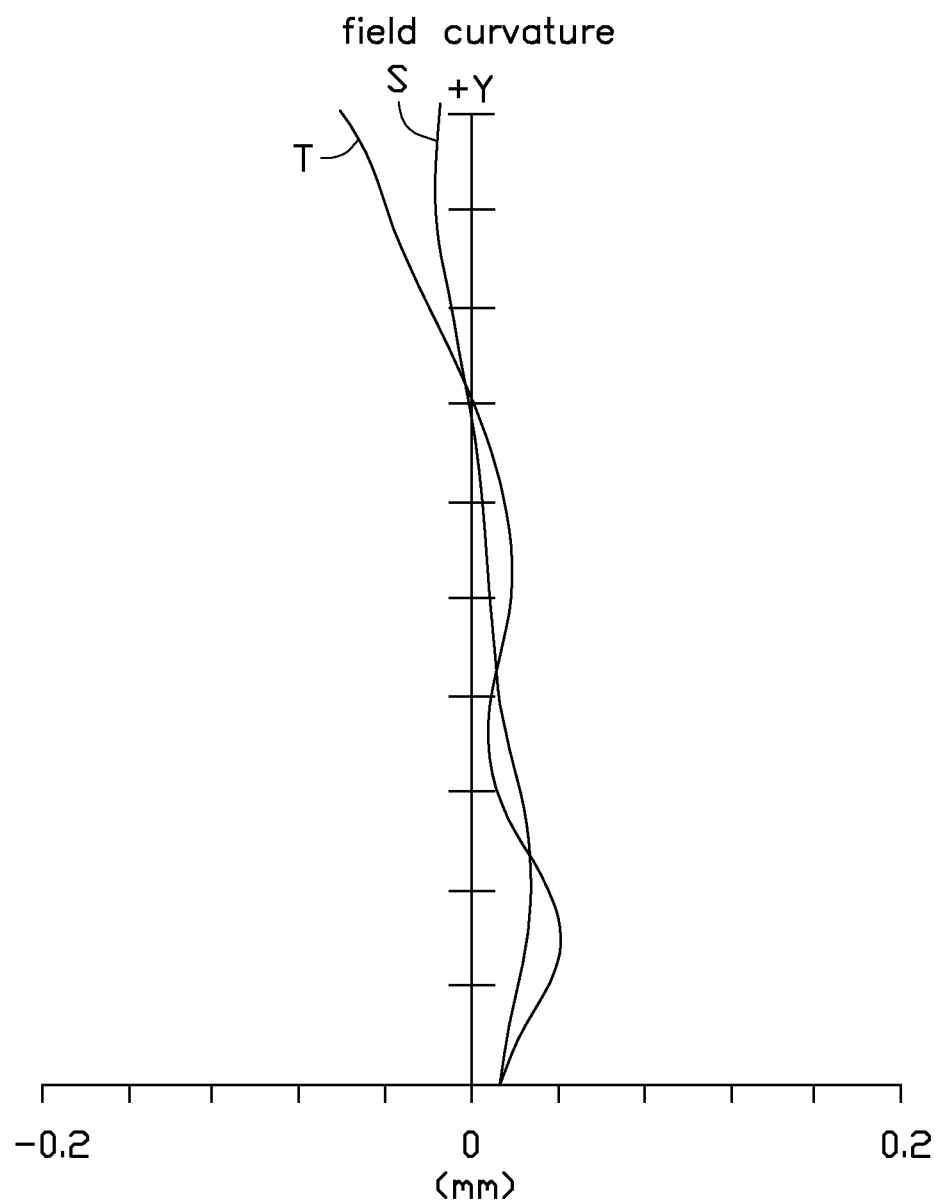
FIG. 8 is a graph showing characteristic curves of field curvature of the image lens of FIG. 1 in accordance with the second embodiment.
Figure 9:
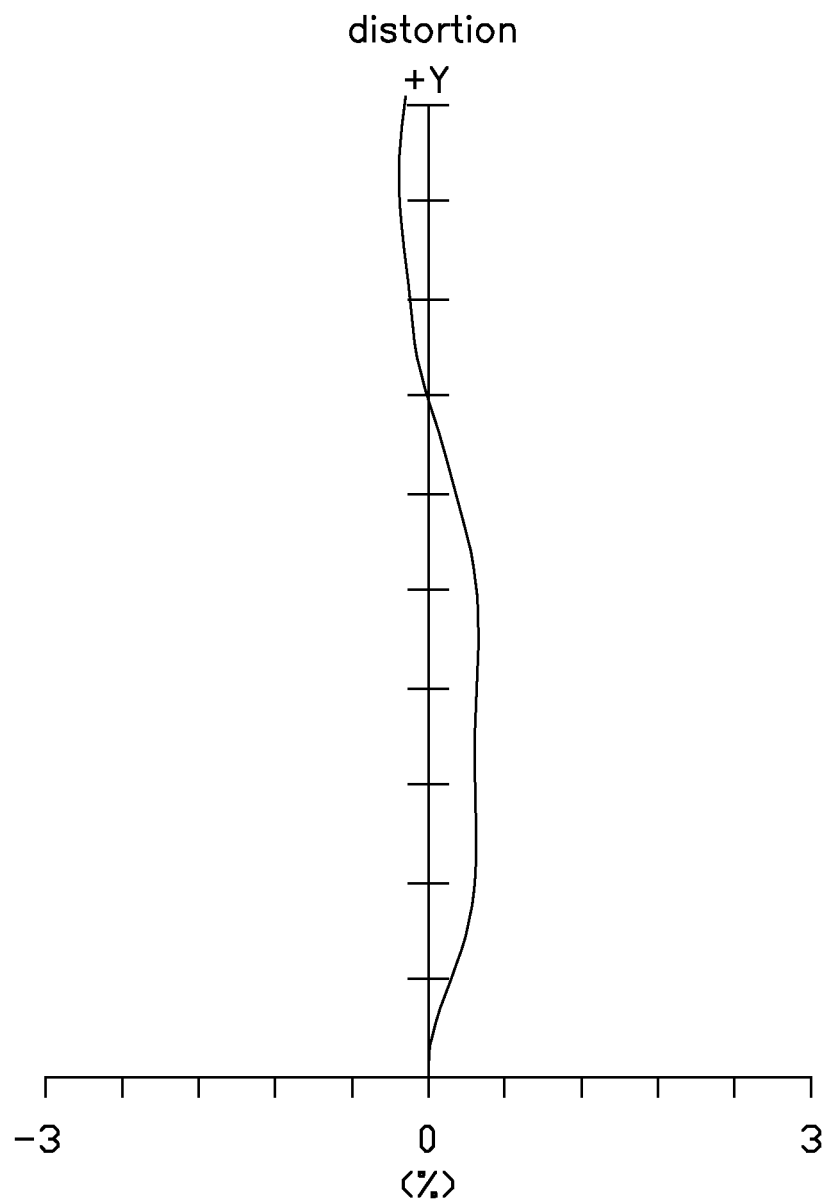
FIG. 9 is a graph showing characteristic curves of distortion of the image lens of FIG. 1 in accordance with the second embodiment.

FIGS. 7-9 are graphs of aberrations (spherical aberration, field curvature, and distortion) occurring in the second exemplary embodiment of the image lens 100. In FIG. 7, curves are spherical aberration characteristic curves of F light (wavelength: 486.1 nm), d light (wavelength: 587.6 nm), C light (wavelength: 656.3 nm) of the image system 100, e light (wavelength: 546.1 nm) of the image system 100, g light (wavelength: 435.8 nm) of the image system 100, h light (wavelength: 404.7 nm) of the image system 100. The spherical aberration of the image lens 100 of the second exemplary embodiment is from −0.10 mm to 0.10 mm. As illustrated in FIG. 8, the curves T and S are respectively the tangential field curvature curve and the sagittal field curvature curve. The field curvature of the second exemplary embodiment of the image lens 100 is from −0.20 mm to 0.20 mm. In FIG. 9, the distortion of the second exemplary embodiment of the image lens system 100 is from −3.00% to 3.00%.

Figure 10:
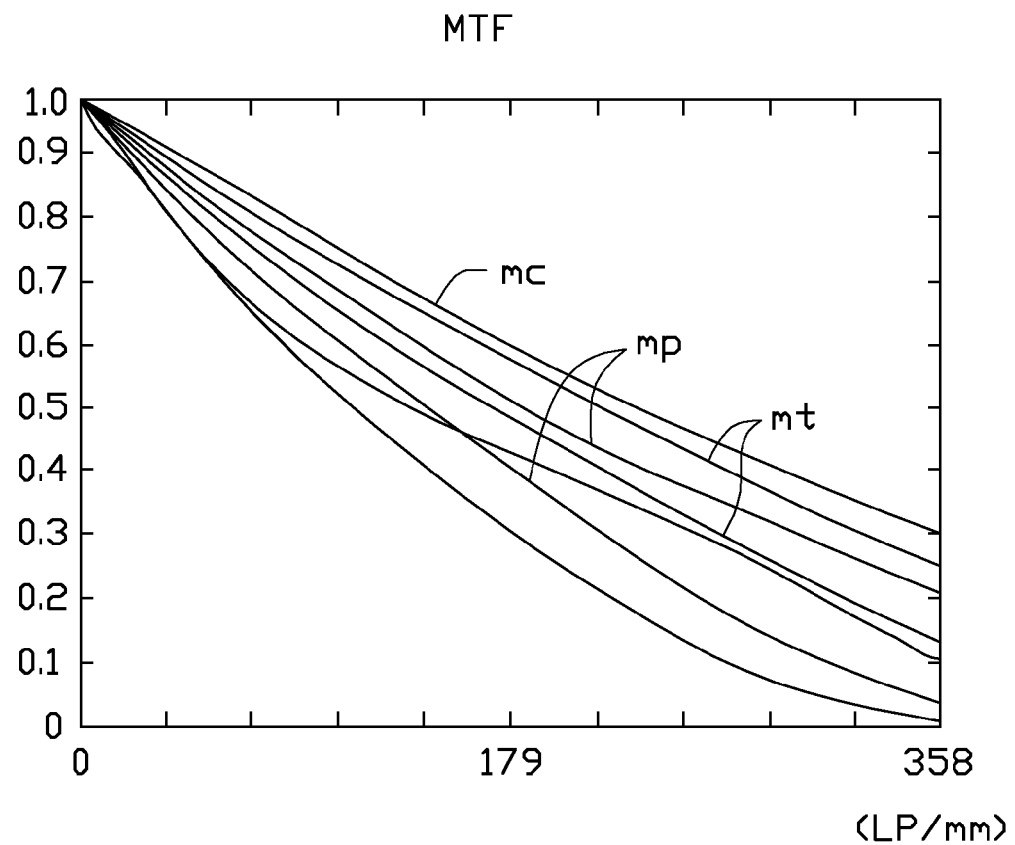
FIG. 10 is a graph showing characteristic curves of modulation transfer mode occurring in the image lens of FIG. 1 in the telephoto mode, according to the second embodiment.

FIG. 10 is a graph showing characteristic curves of modulation transfer mode occurring in the image lens 100 which is in the telephoto mode, according to the second exemplary embodiment. As shown in FIG. 10, for half of the Nyquist frequency (about 179 lp/mm), the MTF of the central field is greater than 59% (see curve mc), the MTF of the 0.8 field is greater than 40% (see curve mp), the MTF between the central field and the 0.8 field is in a range of: 40%~59% (see curve mt, for example).

Figure 11:
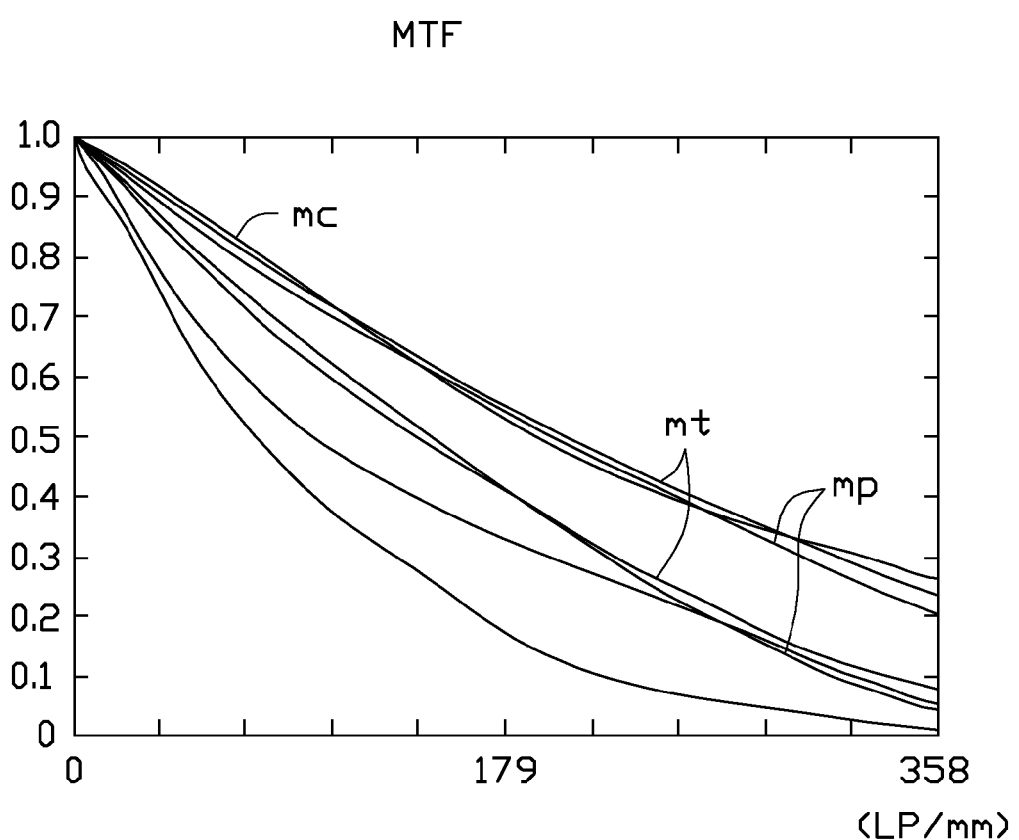
FIG. 11 is a graph showing characteristic curves of modulation transfer mode occurring in the image lens in the wide-angle mode, according to the second embodiment.

FIG. 11 is a graph showing characteristic curves of modulation transfer mode occurring in the image lens 100 which is in the wide-angle mode, according to the second exemplary embodiment. As shown in FIG. 11, for half of the Nyquist frequency (about 179 lp/mm), the MTF of the central field is greater than 50% (see curve mc), the MTF of the 0.8 field is greater than 40% (see curve mp), the MTF between the central field and the 0.8 field is in a range of: 40%~50% (see curve mt, for example).

EXAMPLE 3

Tables 9-12 show a third embodiment of the image lens 100.

TABLE 9

| Surface | type | ri(mm) | Di(mm) | ni | Vi | ki |
|---|---|---|---|---|---|---|
| aperture stop 10 | standard | Infinity | 0.03 | — | — | — |
| first surface S1 | aspherical | 1.74 | 0.63 | 1.54 | 56.1 | 0.0679 |
| second surface S2 | aspherical | −2.94 | 0.03 | — | — | 2.4942 |
| third surface S3 | aspherical | 9.89 | 0.32 | 1.64 | 23.9 | −363.1415 |
| fourth surface S4 | aspherical | 1.89 | 0.49 | — | — | −1.0947 |
| fifth surface S5 | aspherical | −1.74 | 0.60 | 1.53 | 56.0 | −28.1603 |
| sixth surface S6 | aspherical | −0.71 | 0.05 | — | — | −3.5387 |
| seventh surface S7 | aspherical | 3.50 | 0.52 | 1.53 | 56.0 | 0.3002 |
| eighth surface S8 | aspherical | 0.74 | 0.39 | — | — | −5.8045 |
| ninth surface S9 | aspherical | Infinity | 0.21 | 1.52 | 58.6 | — |
| tenth surface S10 | aspherical | Infinity | 0.47 | — | — | — |
| image plane 20 | standard | — | — | — | — | — |

TABLE 10

| aspherical coefficient | first surface S1 | second surface S2 | third surface S3 | fourth surface S4 |
|---|---|---|---|---|
| A4 | −0.1085 | −0.3580 | −0.3299 | −0.0466 |
| A6 | 0.3749 | 0.6052 | 0.4364 | −0.0161 |
| A8 | −2.4247 | −0.3525 | 0.6292 | −0.0159 |
| A10 | 4.9820 | 0.1369 | −0.9918 | 0.9928 |
| A12 | −2.8771 | −0.3413 | −0.0470 | −1.6038 |
| A14 | −2.2221 | −0.4302 | 0.1790 | 0.7767 |

TABLE 11

| aspherical coefficient | fifth surface S5 | sixth surface S6 | seventh surface S7 | eighth surface S8 |
|---|---|---|---|---|
| A4 | −0.3391 | −0.3023 | −0.3881 | −0.2043 |
| A6 | 0.3360 | 0.2264 | 0.2783 | 0.1462 |
| A8 | −0.1645 | −0.1354 | −0.0851 | −0.0873 |
| A10 | −0.1091 | 0.0979 | −5.3E−03 | 0.0328 |
| A12 | 0.4091 | 0.1311 | 5.2E−03 | −7.3E−03 |
| A14 | −0.2294 | −0.0952 | 1.0E−04 | 6.9E−04 |

TABLE 12

| F (mm) | F/No | 2ω |
|---|---|---|
| 2.81 | 2.40 | 65.99° |

In the embodiment, D=3.636 mm; TTL=3.743 mm; Z=0.482 mm; Y=1.617 mm; L=3.035 mm; F1=2.103 mm; F2=−3.694 mm; F3=1.860 mm; F4=−1.874 mm.

Figure 12:
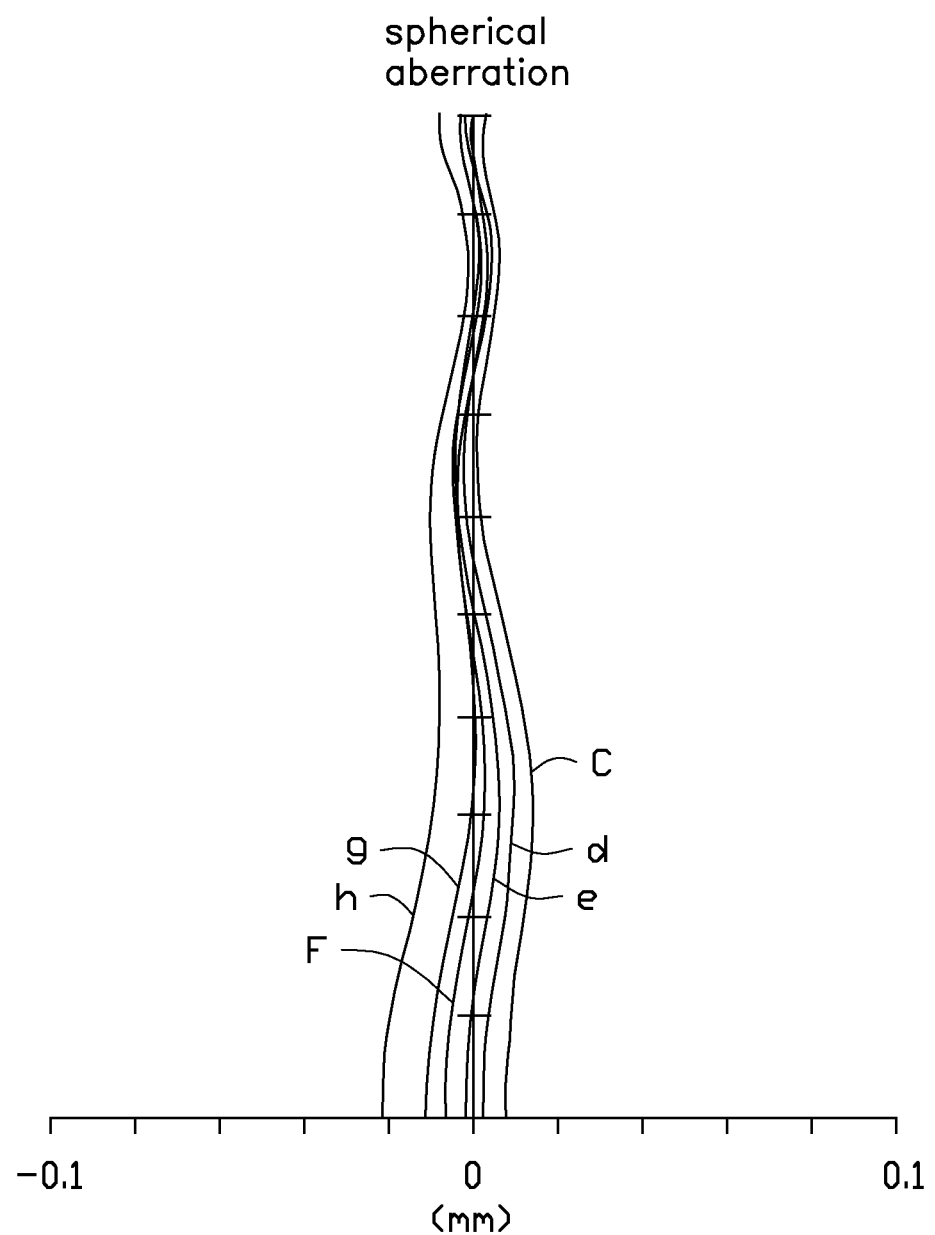
FIG. 12 is a graph showing characteristic curves of spherical aberration of the image lens of FIG. 1 in accordance with a third embodiment.
Figure 13:
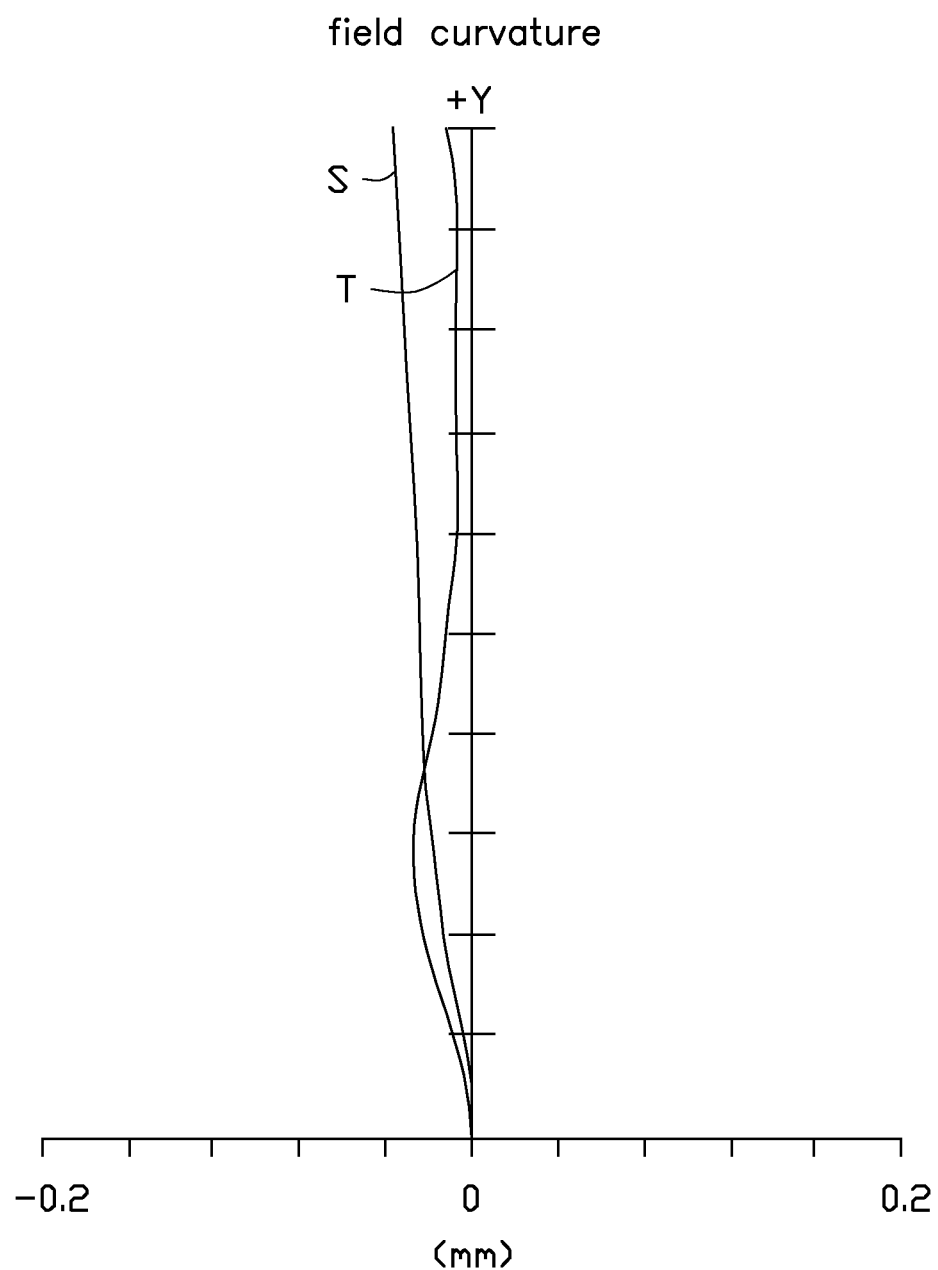
FIG. 13 is a graph showing characteristic curves of field curvature of the image lens of FIG. 1 in accordance with the third embodiment.
Figure 14:
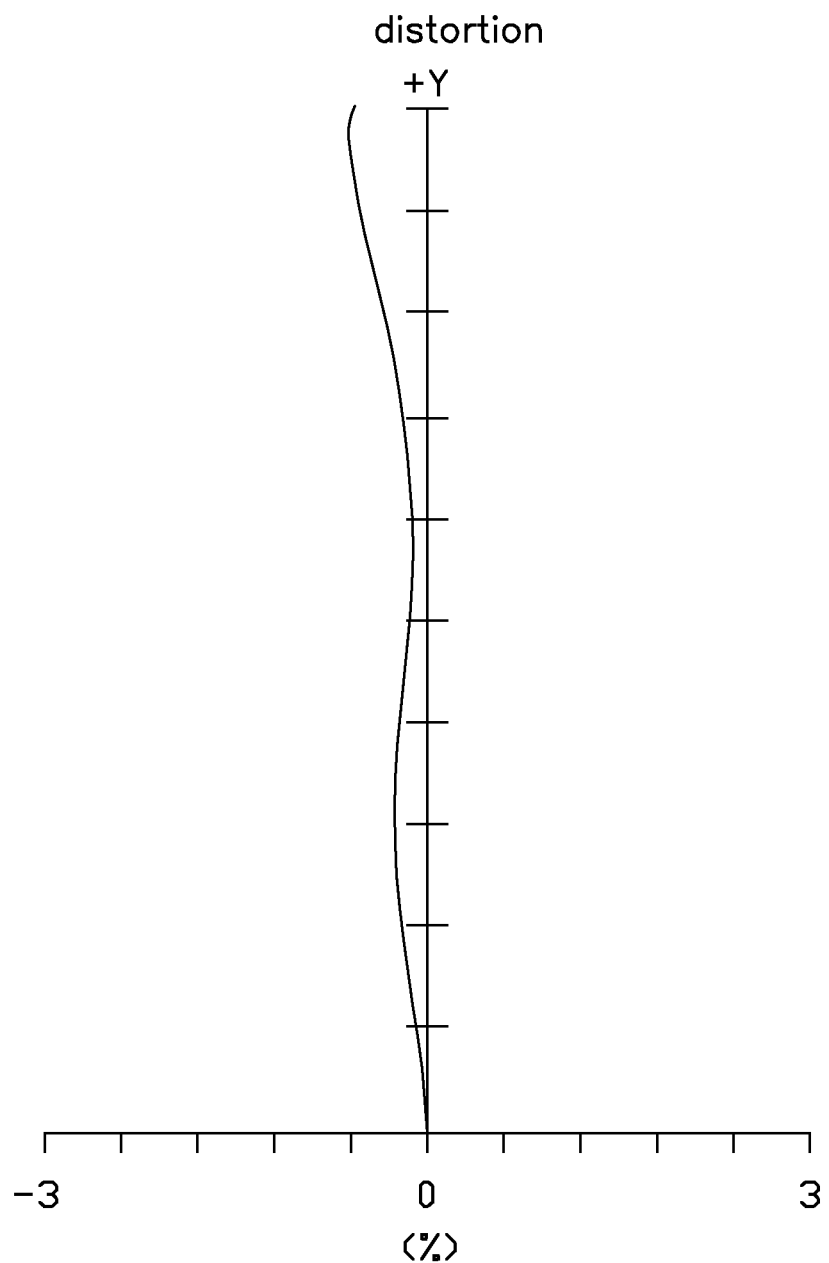
FIG. 14 is a graph showing characteristic curves of distortion of the image lens of FIG. 1 in accordance with the third embodiment.

FIGS. 12-14 are graphs of aberrations (spherical aberration, field curvature, and distortion) occurring in the third exemplary embodiment of the image lens 100. In FIG. 12, curves are spherical aberration characteristic curves of F light (wavelength: 486.1 nm), d light (wavelength: 587.6 nm), C light (wavelength: 656.3 nm) of the image system 100, e light (wavelength: 546.1 nm) of the image system 100, g light (wavelength: 435.8 nm) of the image system 100, h light (wavelength: 404.7 nm) of the image system 100. The spherical aberration of the image lens 100 of the third exemplary embodiment is from −0.10 mm to 0.10 mm. As illustrated in FIG. 13, the curves T and S are respectively the tangential field curvature curve and the sagittal field curvature curve. The field curvature of the third exemplary embodiment of the image lens 100 is from −0.20 mm to 0.20 mm. In FIG. 14, the distortion of the third exemplary embodiment of the image lens system 100 is from −3.00% to 0.

Figure 15:
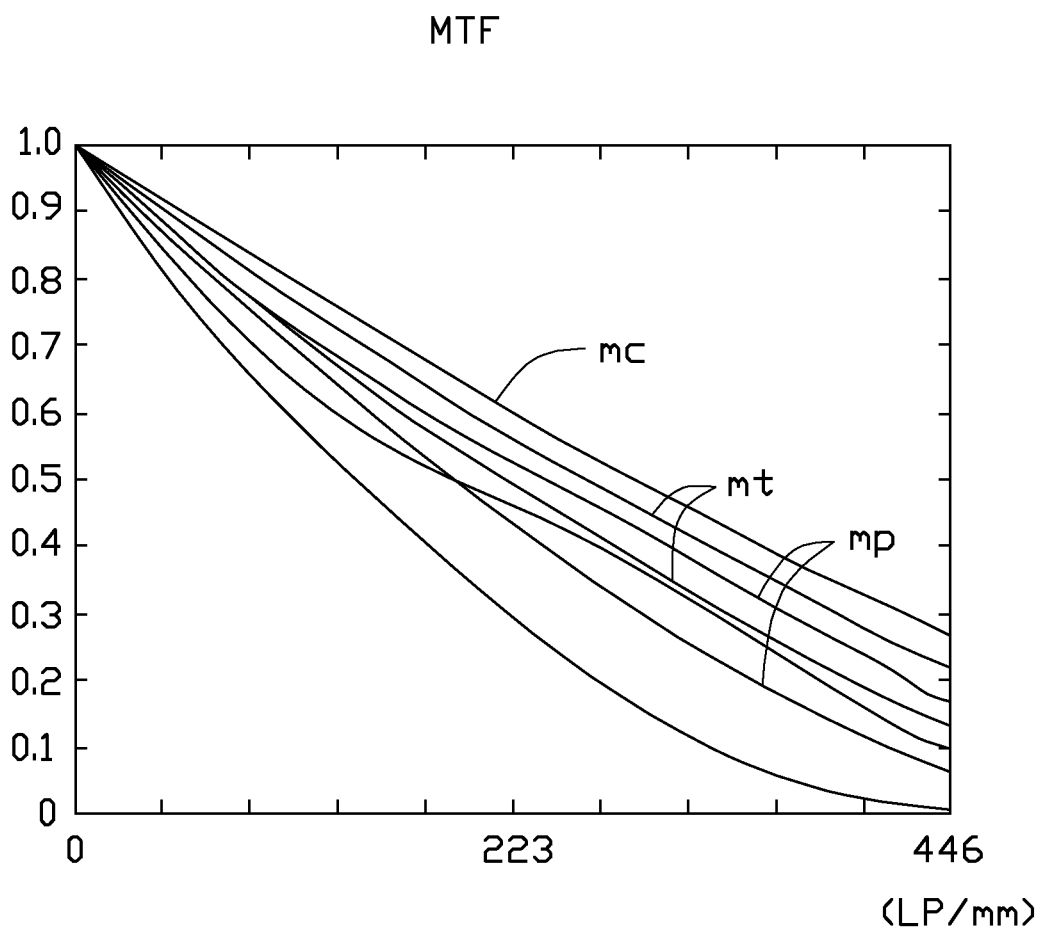
FIG. 15 is a graph showing characteristic curves of modulation transfer mode occurring in the image lens of FIG. 1 in the telephoto mode, according to the third embodiment.

FIG. 15 is a graph showing characteristic curves of modulation transfer mode occurring in the image lens 100 in the telephoto mode, according to the third exemplary embodiment. As shown in FIG. 15, for half of the Nyquist frequency (about 223 lp/mm), the MTF of the central field is greater than 59% (see curve mc), the MTF of the 0.8 field is greater than 40% (see curve mp), the MTF between the central field and the 0.8 field is in a range of: 40%~59% (see curve mt, for example).

Figure 16:
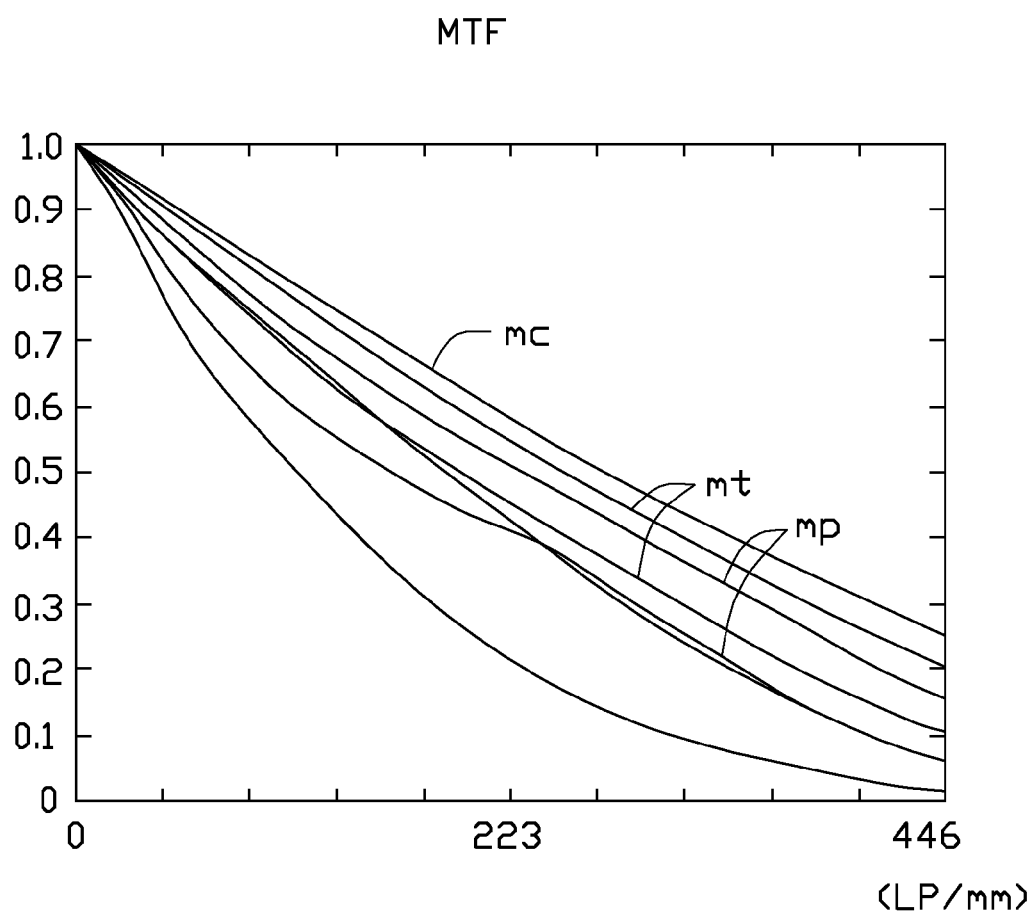
FIG. 16 is a graph showing characteristic curves of modulation transfer mode occurring in the image lens in the wide-angle mode, according to the third embodiment.

FIG. 16 is a graph showing characteristic curves of modulation transfer mode occurring in the image lens 100 in the wide-angle mode, according to the third exemplary embodiment. As shown in FIG. 16, for half of the Nyquist frequency (about 223 lp/mm), the MTF of the central field is greater than 50% (see curve mc), the MTF of the 0.8 field is greater than 40% (see curve mp), the MTF between the central field and the 0.8 field is in a range of: 40%~50% (see curve mt, for example).

EXAMPLE 4

Tables 13-16 show a fourth embodiment of the image lens 100.

TABLE 13

| Surface | type | ri(mm) | Di(mm) | ni | Vi | ki |
|---|---|---|---|---|---|---|
| aperture stop 10 | standard | Infinity | −2.0E−03 | — | — | — |
| first surface S1 | aspherical | 1.74 | 0.63 | 1.54 | 56.1 | 0.07 |
| second surface S2 | aspherical | −2.94 | 0.03 | — | — | 2.49 |
| third surface S3 | aspherical | 9.89 | 0.32 | 1.64 | 23.9 | −363.04 |
| fourth surface S4 | aspherical | 1.89 | 0.49 | — | — | −1.10 |
| fifth surface S5 | aspherical | −1.74 | 0.60 | 1.53 | 56.0 | −28.15 |
| sixth surface S6 | aspherical | −0.71 | 0.05 | — | — | −3.54 |
| seventh surface S7 | aspherical | 3.50 | 0.52 | 1.53 | 56.0 | 0.31 |
| eighth surface S8 | aspherical | 0.74 | 0.39 | — | — | −5.80 |
| ninth surface S9 | aspherical | Infinity | 0.21 | 1.52 | 54.5 | — |
| tenth surface S10 | aspherical | Infinity | 0.47 | — | — | — |
| image plane 20 | standard | — | — | — | — | — |

TABLE 14

| aspherical coefficient | first surface S1 | second surface S2 | third surface S3 | fourth surface S4 |
|---|---|---|---|---|
| A4 | −0.1085 | −0.3580 | −0.3299 | −0.0466 |
| A6 | 0.3747 | 0.6052 | 0.4364 | −0.0161 |
| A8 | −2.4250 | −0.3525 | 0.6291 | −0.0157 |
| A10 | 4.9820 | 0.1365 | −0.9920 | 0.9932 |
| A12 | −2.8732 | −0.3434 | −0.0469 | −1.6029 |
| A14 | −2.1950 | −0.4379 | 0.1802 | 0.7785 |

TABLE 15

| aspherical coefficient | fifth surface S5 | sixth surface S6 | seventh surface S7 | eighth surface S8 |
|---|---|---|---|---|
| A4 | −0.3391 | −0.3023 | −0.3881 | −0.2041 |
| A6 | 0.3360 | 0.2264 | 0.2783 | 0.1461 |
| A8 | −0.1645 | −0.1354 | −0.0851 | −0.0873 |
| A10 | −0.1092 | 0.0979 | −5.3E−03 | 0.0328 |
| A12 | 0.4089 | 0.1311 | 5.2E−03 | −7.3E−03 |
| A14 | −0.2298 | −0.0952 | 1.0E−04 | 6.8E−04 |

TABLE 16

| F (mm) | F/No | 2ω |
|---|---|---|
| 2.81 | 2.40 | 65.97° |

In the embodiment, D=3.636 mm; TTL=3.714 mm; Z=0.480 mm; Y=1.6174 mm; L=3.028 mm; F1=2.103 mm; F2=−3.694 mm; F3=1.860 mm; F4=−1.874 mm.

Figure 17:
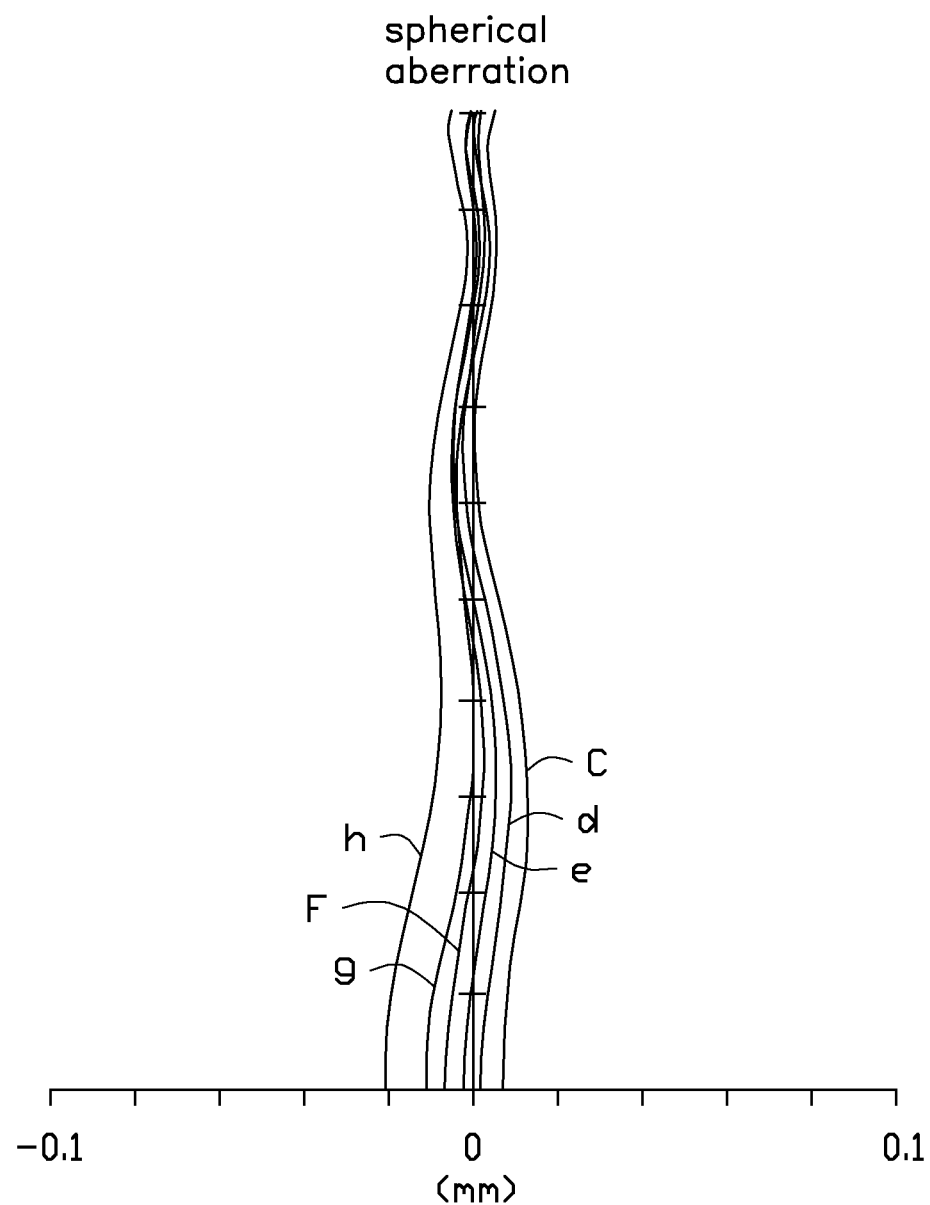
FIG. 17 is a graph showing characteristic curves of spherical aberration of the image lens of FIG. 1 in accordance with a fourth embodiment.
Figure 18:
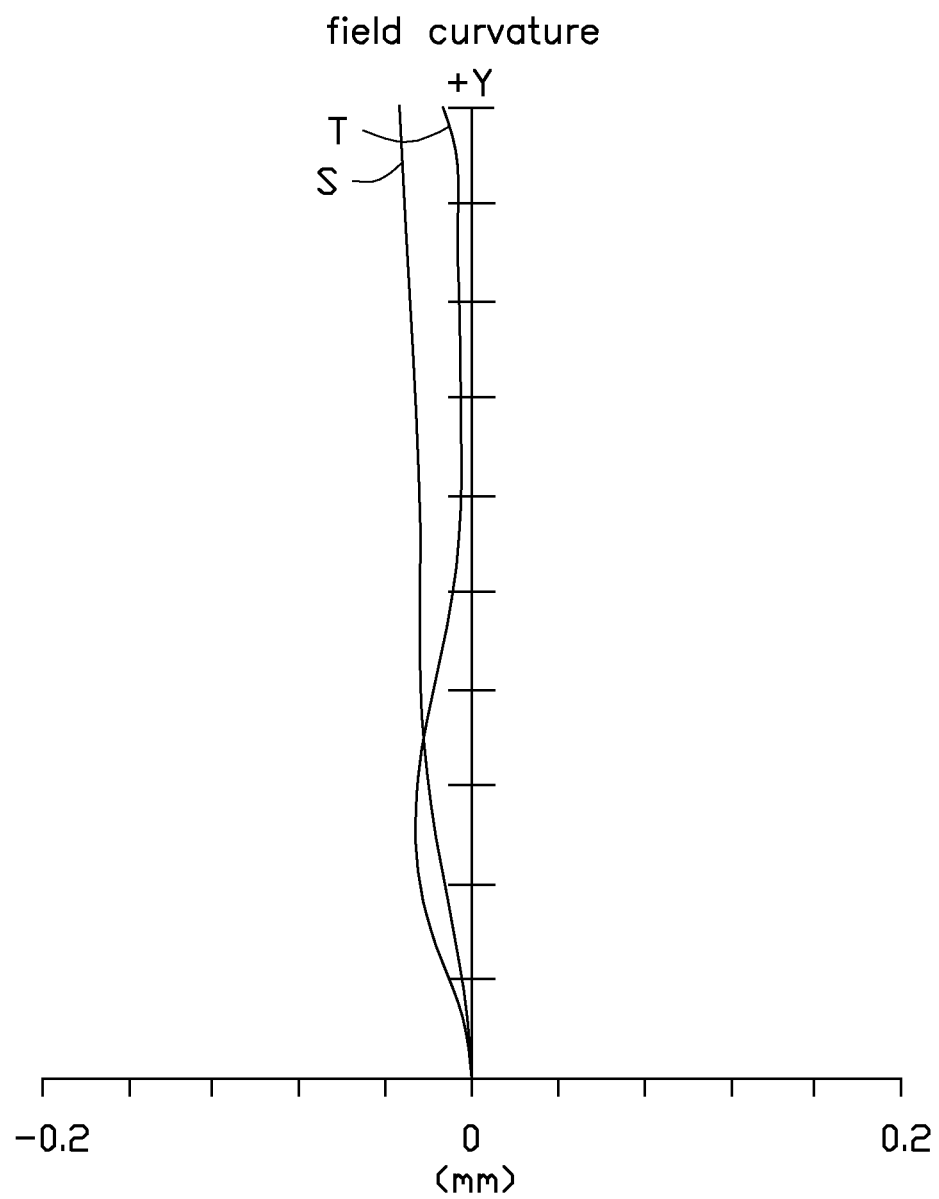
FIG. 18 is a graph showing characteristic curves of field curvature of the image lens of FIG. 1 in accordance with the fourth embodiment.
Figure 19:
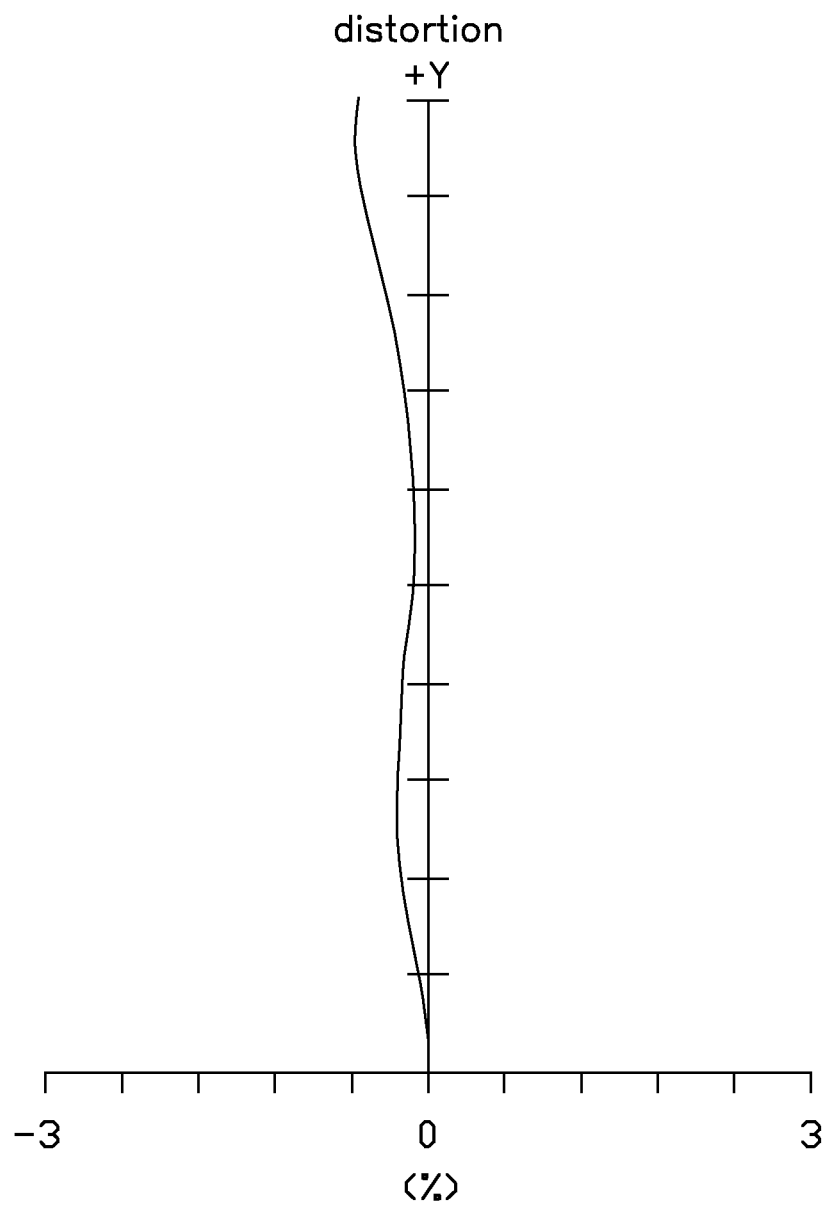
FIG. 19 is a graph showing characteristic curves of distortion of the image lens of FIG. 1 in accordance with the fourth embodiment.

FIGS. 17-19 are graphs of aberrations (spherical aberration, field curvature, and distortion) occurring in the fourth exemplary embodiment of the image lens 100. In FIG. 17, curves are spherical aberration characteristic curves of F light (wavelength: 486.1 nm), d light (wavelength: 587.6 nm), C light (wavelength: 656.3 nm) of the image system 100, e light (wavelength: 546.1 nm) of the image system 100, g light (wavelength: 435.8 nm) of the image system 100, h light (wavelength: 404.7 nm) of the image system 100. The spherical aberration of the image lens 100 of the fourth exemplary embodiment is from −0.10 mm to 0.10 mm. As illustrated in FIG. 18, the curves T and S are respectively the tangential field curvature curve and the sagittal field curvature curve. The field curvature of the fourth exemplary embodiment of the image lens 100 is from −0.20 mm to 0.20 mm. In FIG. 19, the distortion of the fourth exemplary embodiment of the image lens system 100 is from −3.00% to 0.

Figure 20:
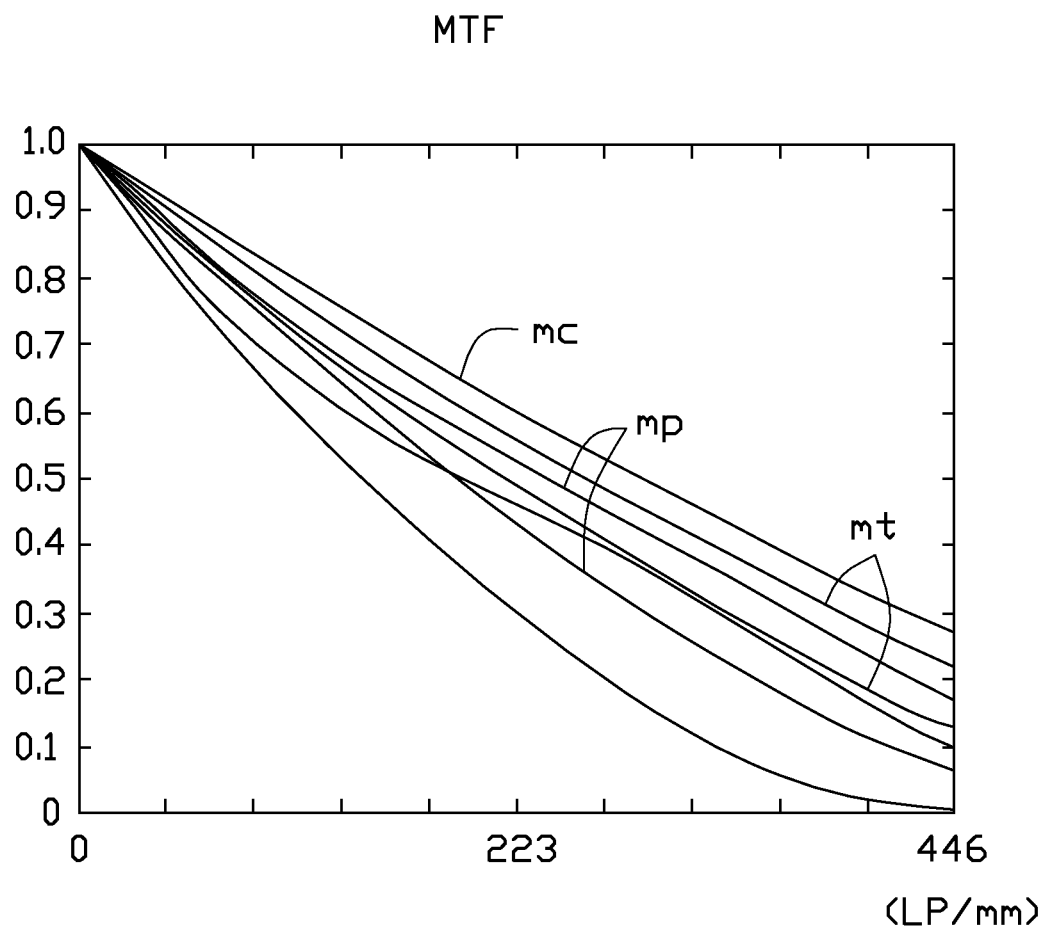
FIG. 20 is a graph showing characteristic curves of modulation transfer mode occurring in the image lens of FIG. 1 in the telephoto mode, according to the fourth embodiment.

FIG. 20 is a graph showing characteristic curves of modulation transfer mode occurring in the image lens 100 in the telephoto mode, according to the fourth exemplary embodiment. As shown in FIG. 20, for half of the Nyquist frequency (about 223 lp/mm), the MTF of the central field is greater than 59% (see curve mc), the MTF of the 0.8 field is greater than 40% (see curve mp), the MTF between the central field and the 0.8 field is in a range of: 40%~59% (see curve mt, for example).

Figure 21:
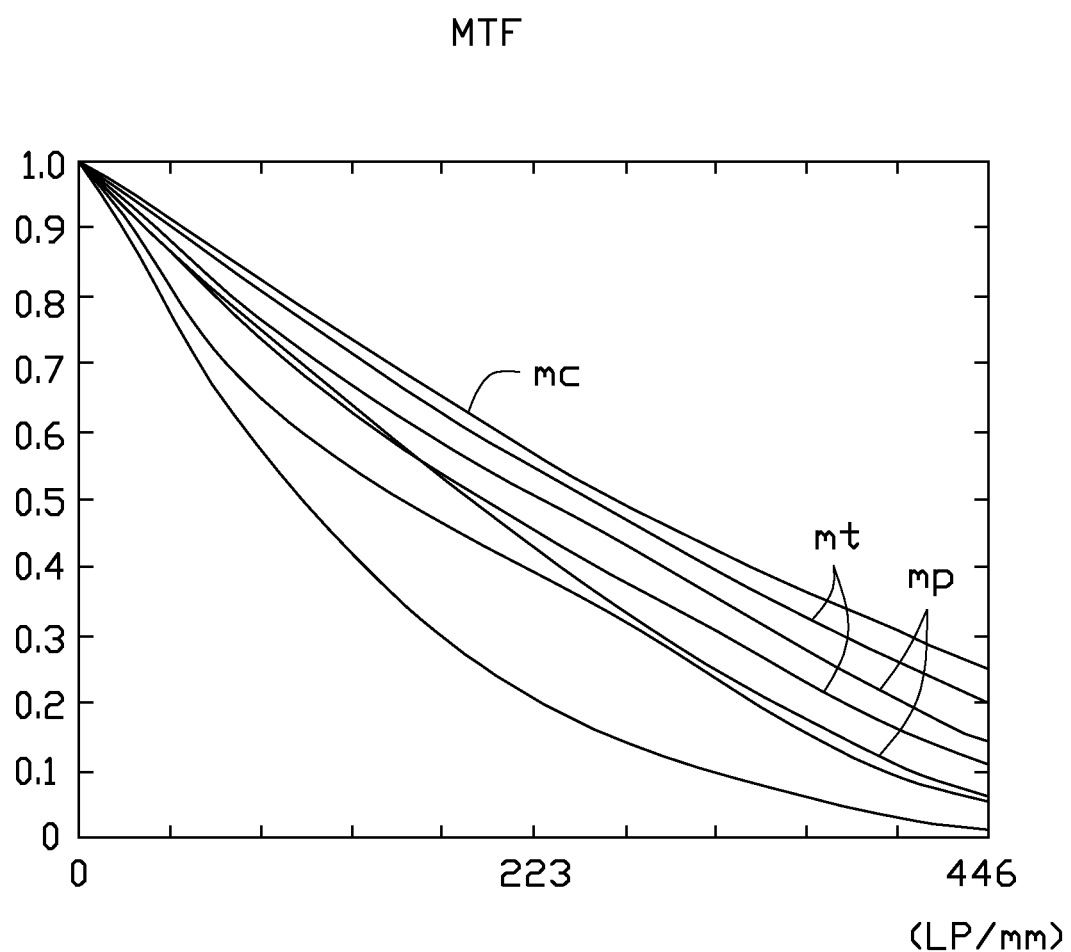
FIG. 21 is a graph showing characteristic curves of modulation transfer mode occurring in the image lens in the wide-angle mode, according to the fourth embodiment.

FIG. 21 is a graph showing characteristic curves of modulation transfer mode occurring in the image lens 100 in the wide-angle mode, according to the fourth exemplary embodiment. As shown in FIG. 21, for half of the Nyquist frequency (about 223 lp/mm), the MTF of the central field is greater than 50% (see curve mc), the MTF of the 0.8 field is greater than 40% (see curve mp), the MTF between the central field and the 0.8 field is in a range of: 40%~50% (see curve mt, for example).

EXAMPLE 5

Tables 17-20 show a fifth embodiment of the image lens 100.

TABLE 17

| Surface | type | ri(mm) | Di(mm) | ni | Vi | ki |
|---|---|---|---|---|---|---|
| aperture stop 10 | standard | Infinity | 0.03 | — | — | — |
| first surface S1 | aspherical | 1.89 | 0.63 | 1.54 | 56.1 | −1.70 |
| second surface S2 | aspherical | −2.84 | 0.03 | — | — | — |
| third surface S3 | aspherical | 10.06 | 0.28 | 1.64 | 23.9 | — |
| fourth surface S4 | aspherical | 1.74 | 0.50 | — | — | −12.63 |
| fifth surface S5 | aspherical | −3.80 | 0.71 | 1.53 | 56.0 | 9.55 |
| sixth surface S6 | aspherical | −0.80 | 0.25 | — | — | −4.97 |
| seventh surface S7 | aspherical | 9.53 | 0.35 | 1.53 | 56.0 | — |
| eighth surface S8 | aspherical | 0.82 | 0.30 | — | — | −5.67 |
| ninth surface S9 | aspherical | Infinity | 0.21 | 1.52 | 58.6 | — |
| tenth surface S10 | aspherical | Infinity | 0.57 | — | — | — |
| image plane 20 | standard | — | — | — | — | — |

TABLE 18

| aspherical coefficient | first surface S1 | second surface S2 | third surface S3 | fourth surface S4 |
|---|---|---|---|---|
| A4 | −0.0213 | −2.5E−03 | −0.0472 | 0.2265 |
| A6 | 0.0267 | −0.0567 | −0.0880 | −0.4545 |
| A8 | −0.3549 | 0.1687 | 0.5560 | 0.7372 |
| A10 | 0.4778 | −0.3725 | −0.5416 | −0.4416 |
| A12 | −0.3586 | 0.0520 | 0.0535 | 0.0365 |

TABLE 19

| aspherical coefficient | fifth surface S5 | sixth surface S6 | seventh surface S7 | eighth surface S8 |
|---|---|---|---|---|
| A4 | 0.1350 | −0.2805 | −0.1086 | −0.1042 |
| A6 | −0.1109 | 0.6024 | −0.0240 | 0.0319 |
| A8 | 0.0526 | −0.7767 | 0.0316 | −8.1E−03 |

TABLE 19-continued

| aspherical coefficient | fifth surface S5 | sixth surface S6 | seventh surface S7 | eighth surface S8 |
|---|---|---|---|---|
| A10 | 0.0628 | 0.5443 | −5.7E−03 | 9.5E−04 |
| A12 | −0.0333 | −0.1372 | 5.0E−05 | −4.6E−05 |

TABLE 20

| F (mm) | F/No | 2ω |
|---|---|---|
| 2.96 | 2.39 | 75.26° |

In the embodiment, D=4.544 mm; TTL=3.859 mm; Z=0.410 mm; Y=2.039 mm; L=3.826 mm; F1=2.182 mm; F2=−3.326 mm; F3=1.750 mm; F4=−1.694 mm.

Figure 22:
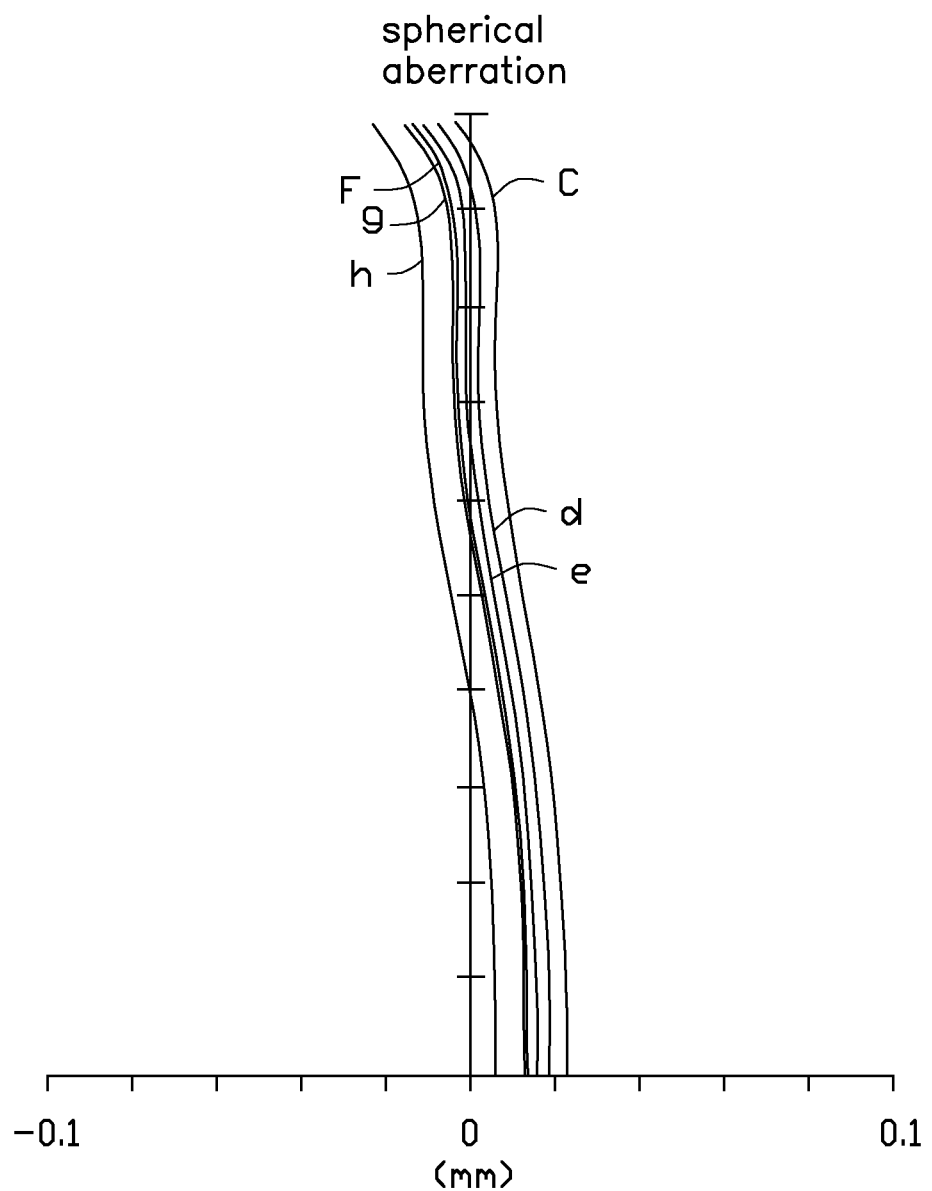
FIG. 22 is a graph showing characteristic curves of spherical aberration of the image lens of FIG. 1 in accordance with a fifth embodiment.
Figure 23:
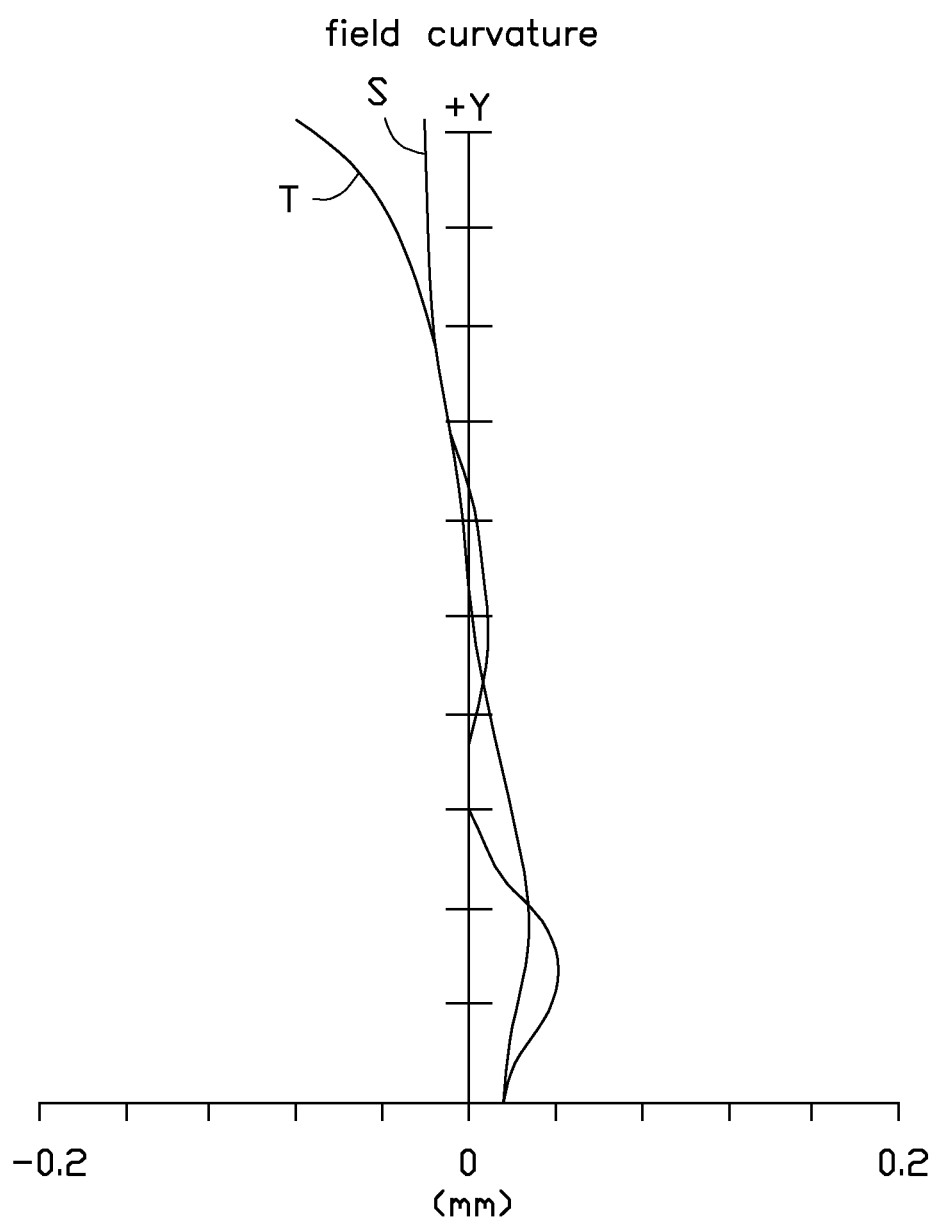
FIG. 23 is a graph showing characteristic curves of field curvature of the image lens of FIG. 1 in accordance with the fifth embodiment.
Figure 24:
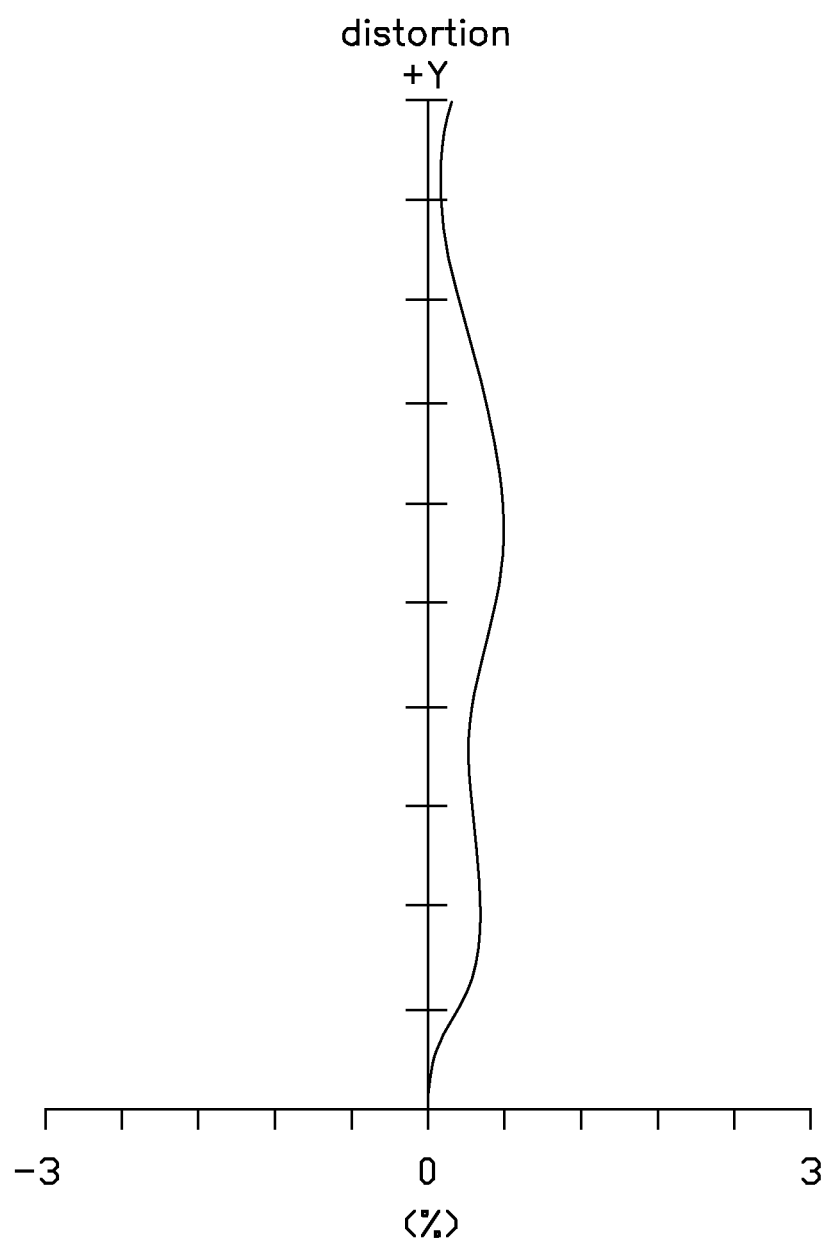
FIG. 24 is a graph showing characteristic curves of distortion of the image lens of FIG. 1 in accordance with the fifth embodiment.

FIGS. 22-24 are graphs of aberrations (spherical aberration, field curvature, and distortion) occurring in the fifth exemplary embodiment of the image lens 100. In FIG. 22, curves are spherical aberration characteristic curves of F light (wavelength: 486.1 nm), d light (wavelength: 587.6 nm), C light (wavelength: 656.3 nm) of the image system 100, e light (wavelength: 546.1 nm) of the image system 100, g light (wavelength: 435.8 nm) of the image system 100, h light (wavelength: 404.7 nm) of the image system 100. The spherical aberration of the image lens 100 of the fifth exemplary embodiment is from −0.10 mm to 0.10 mm. As illustrated in FIG. 23, the curves T and S are respectively the tangential field curvature curve and the sagittal field curvature curve. The field curvature of the fifth exemplary embodiment of the image lens 100 is from −0.20 mm to 0.20 mm. In FIG. 24, the distortion of the fifth exemplary embodiment of the image lens system 100 is from 0 to 3.00%.

Figure 25:
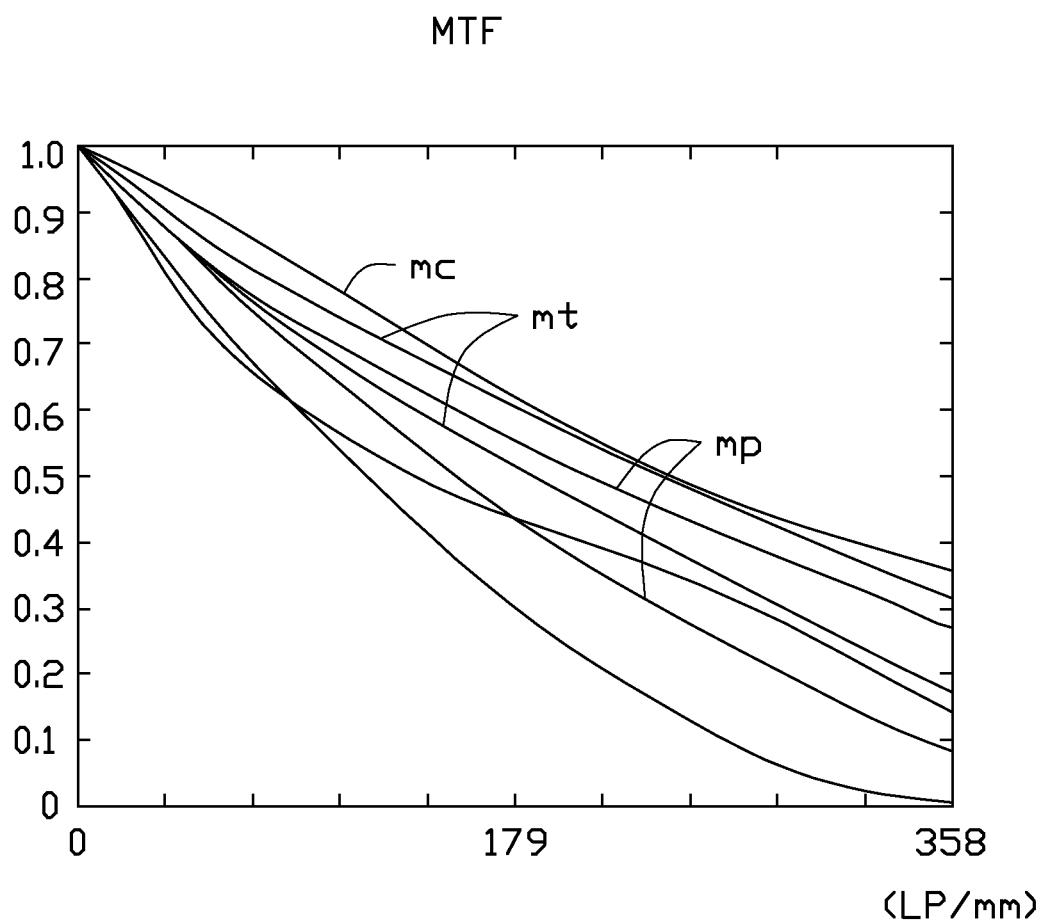
FIG. 25 is a graph showing characteristic curves of modulation transfer mode occurring in the image lens of FIG. 1 in the telephoto mode, according to the fifth embodiment.

FIG. 25 is a graph showing characteristic curves of modulation transfer mode occurring in the image lens 100 in the telephoto mode, according to the fifth exemplary embodiment. As shown in FIG. 25, for half of the Nyquist frequency (about 179 lp/mm), the MTF of the central field is greater than 59% (see curve mc), the MTF of the 0.8 field is greater than 40% (see curve mp), the MTF between the central field and the 0.8 field is in a range of: 40%~59% (see curve mt, for example).

Figure 26:
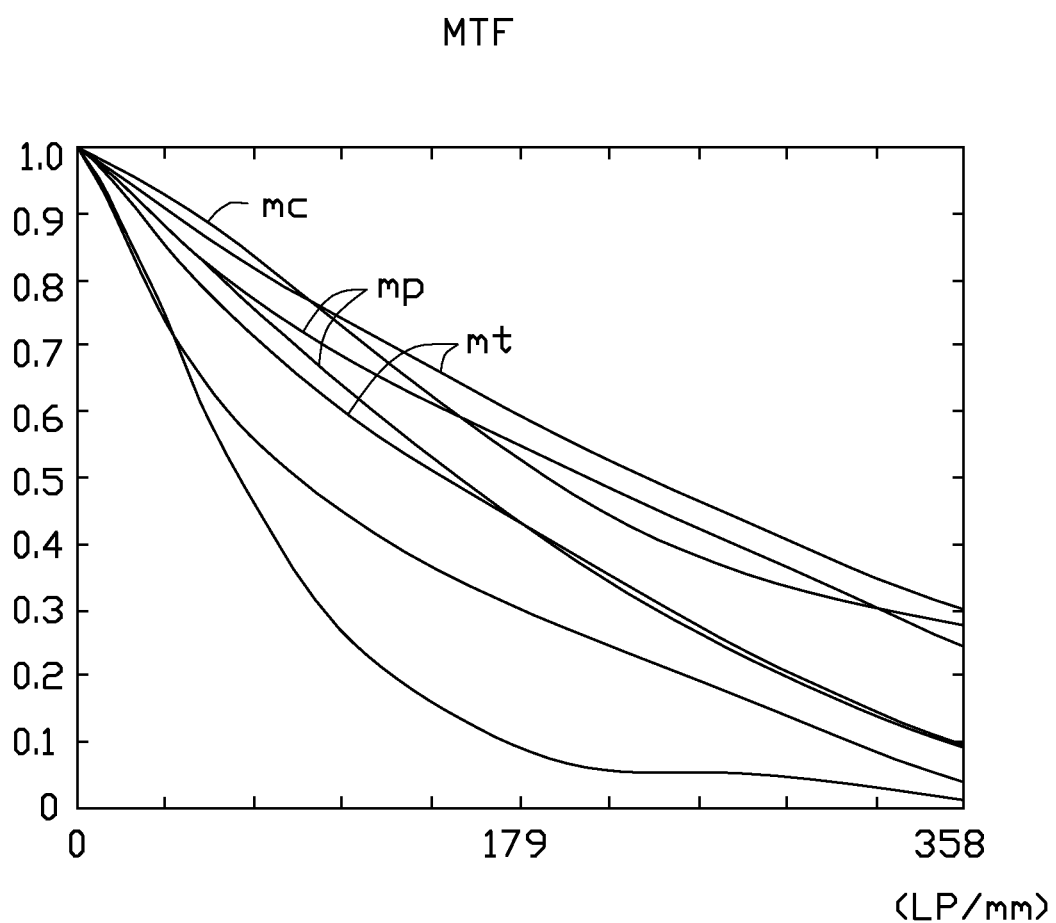
FIG. 26 is a graph showing characteristic curves of modulation transfer mode occurring in the image lens in the wide-angle mode, according to the fifth embodiment.

FIG. 26 is a graph showing characteristic curves of modulation transfer mode occurring in the image lens 100 in the wide-angle mode, according to the fifth exemplary embodiment. As shown in FIG. 26, for half of the Nyquist frequency (about 179 lp/mm), the MTF of the central field is greater than 50% (see curve mc), the MTF of the 0.8 field is greater than 40% (see curve mp), the MTF between the central field and the 0.8 field is in a range of: 40%~50% (see curve mt, for example).

EXAMPLE 6

Tables 21-24 show a sixth embodiment of the image lens 100.

TABLE 21

| Surface | type | ri(mm) | Di(mm) | ni | Vi | ki |
|---|---|---|---|---|---|---|
| aperture stop 10 | standard | Infinity | −0.05 | — | — | — |
| first surface S1 | aspherical | 1.85 | 0.71 | 1.54 | 56.1 | 1.09 |
| second surface S2 | aspherical | −3.14 | 0.03 | — | — | −13.69 |
| third surface S3 | aspherical | 9.25 | 0.28 | 1.64 | 23.9 | — |
| fourth surface S4 | aspherical | 1.73 | 0.43 | — | — | −0.19 |
| fifth surface S5 | aspherical | −10.93 | 1.03 | 1.53 | 56.0 | −642.02 |
| sixth surface S6 | aspherical | −0.81 | 0.16 | — | — | −4.58 |
| seventh surface S7 | aspherical | −9.15 | 0.35 | 1.53 | 56.0 | — |
| eighth surface S8 | aspherical | 0.86 | 0.35 | — | — | −6.65 |
| ninth surface S9 | aspherical | Infinity | 0.21 | 1.52 | 54.5 | — |
| tenth surface S10 | aspherical | Infinity | 0.60 | — | — | — |
| image plane 20 | standard | — | — | — | — | — |

TABLE 22

| aspherical coefficient | first surface S1 | second surface S2 | third surface S3 | fourth surface S4 |
|---|---|---|---|---|
| A4 | −0.0555 | −0.0263 | −0.0719 | −0.1018 |
| A6 | 0.0526 | −0.0201 | 0.0528 | 0.0940 |
| A8 | −0.4577 | 0.0217 | 0.0700 | 0.0146 |
| A10 | 0.9994 | −0.1103 | 0.0787 | 0.0624 |
| A12 | −1.2025 | 0.2622 | −0.1694 | −0.1214 |
| A14 | 0.5640 | −0.2614 | 0.0160 | 0.0371 |

TABLE 23

| aspherical coefficient | fifth surface S5 | sixth surface S6 | seventh surface S7 | eighth surface S8 |
|---|---|---|---|---|
| A4 | −0.0202 | −0.1677 | −0.2145 | −0.1744 |
| A6 | 0.0284 | 0.1467 | 1.4E−03 | 0.0934 |
| A8 | 2.6E−03 | −0.0878 | 0.0609 | −0.0397 |
| A10 | −4.7E−03 | 0.0316 | −0.0148 | 0.0110 |
| A12 | 0.0433 | 0.0184 | −6.5E−03 | −1.9E−03 |
| A14 | −0.0332 | −0.0106 | 1.5E−04 | 1.2E−04 |

TABLE 24

| F (mm) | F/No | 2ω |
|---|---|---|
| 3.23 | 2.39 | 70.13° |

In the embodiment, D=4.511 mm; TTL=4.142 mm; Z=0.511 mm; Y=1.906 mm; L=3.512 mm; F1=2.242 mm; F2=−3.372 mm; F3=1.577 mm; F4=−1.445 mm.

Figure 27:
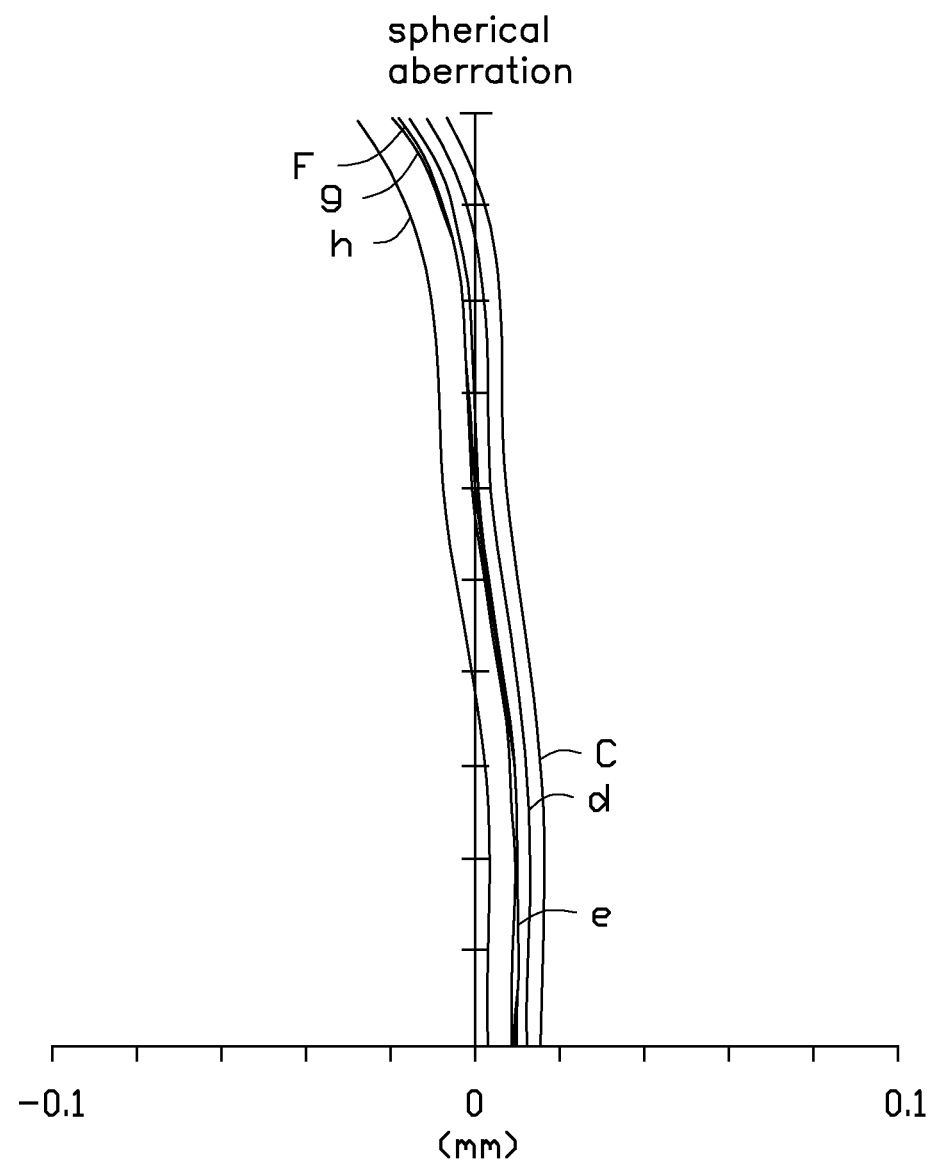
FIG. 27 is a graph showing characteristic curves of spherical aberration of the image lens of FIG. 1 in accordance with a sixth embodiment.
Figure 28:
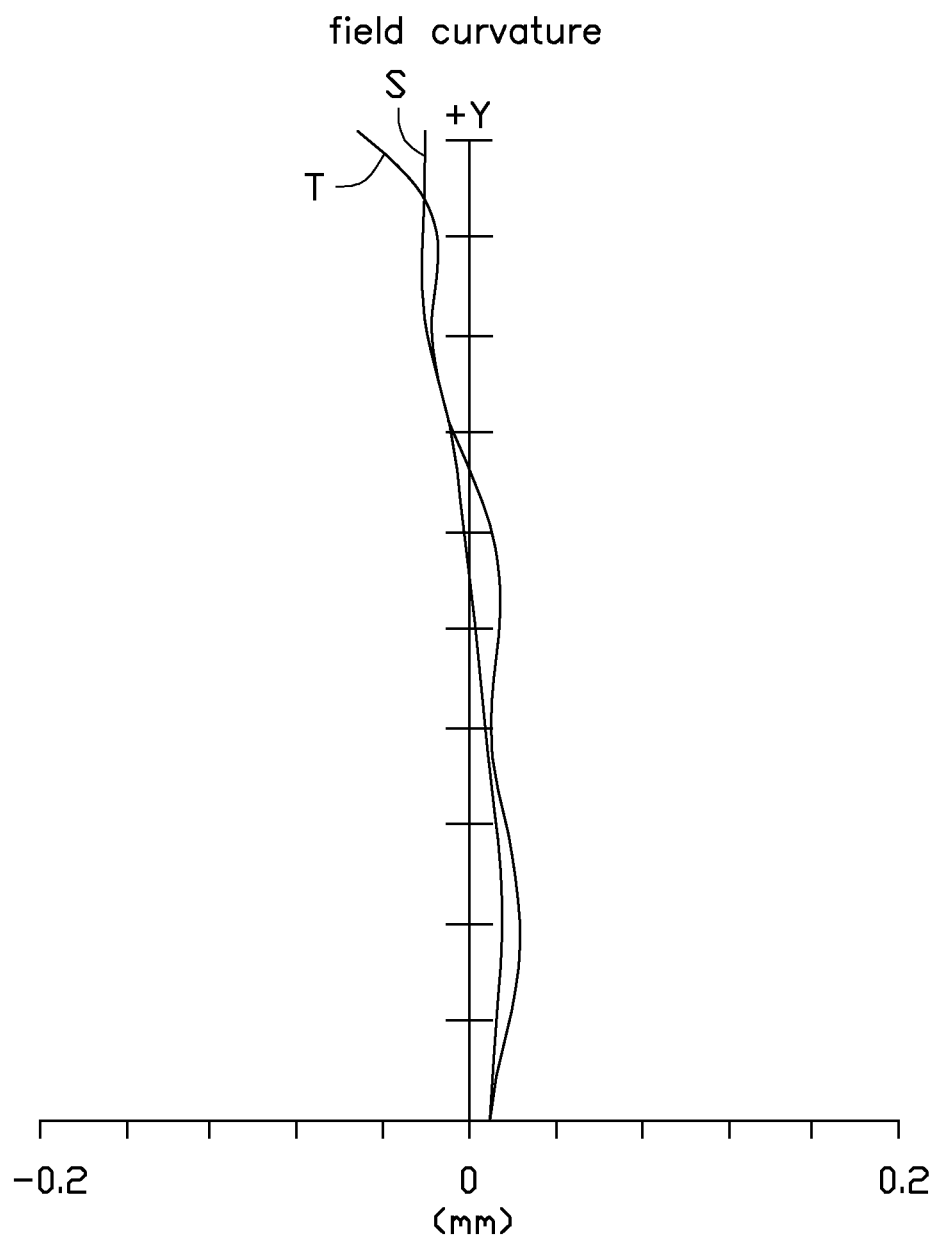
FIG. 28 is a graph showing characteristic curves of field curvature of the image lens of FIG. 1 in accordance with the sixth embodiment.
Figure 29:
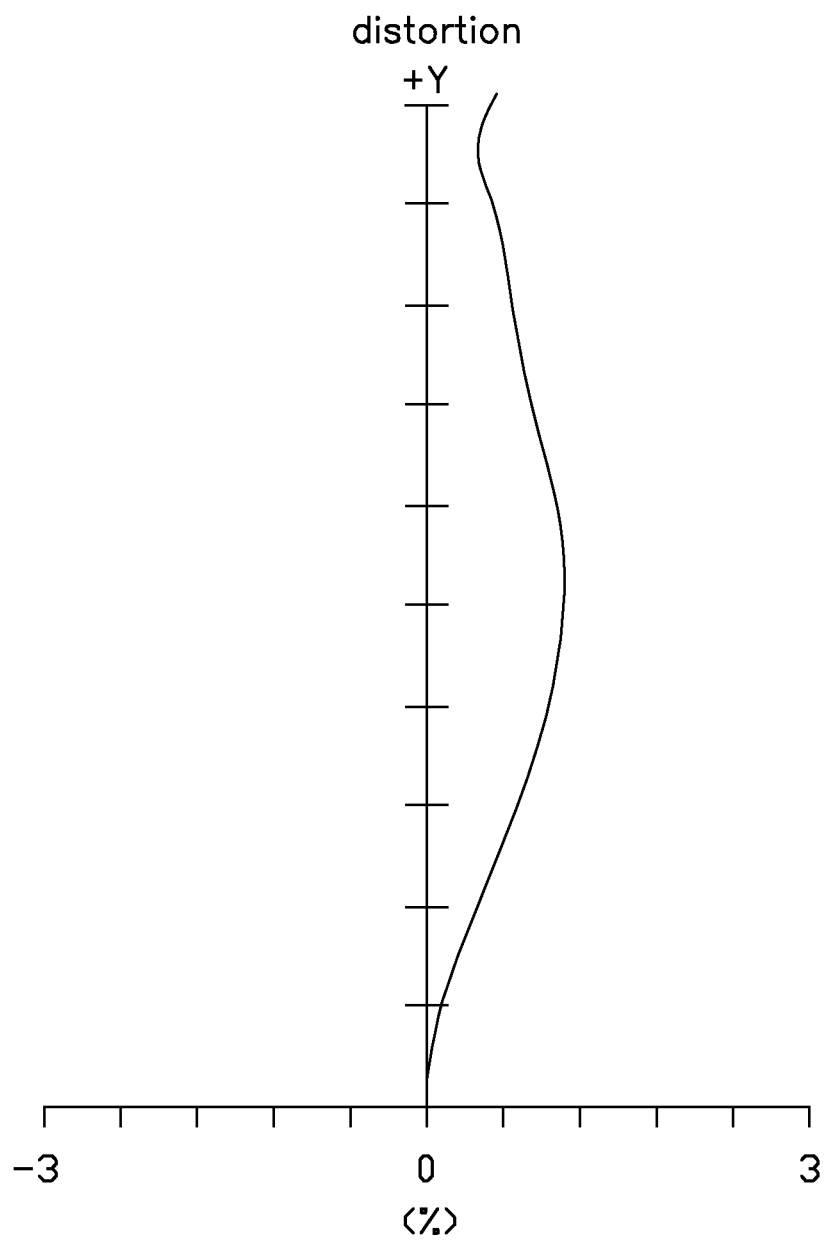
FIG. 29 is a graph showing characteristic curves of distortion of the image lens of FIG. 1 in accordance with the sixth embodiment.

FIGS. 27-29 are graphs of aberrations (spherical aberration, field curvature, and distortion) occurring in the sixth exemplary embodiment of the image lens 100. In FIG. 27, curves are spherical aberration characteristic curves of F light (wavelength: 486.1 nm), d light (wavelength: 587.6 nm), C light (wavelength: 656.3 nm) of the image system 100, e light (wavelength: 546.1 nm) of the image system 100, g light (wavelength: 435.8 nm) of the image system 100, h light (wavelength: 404.7 nm) of the image system 100. The spherical aberration of the image lens 100 of the sixth exemplary embodiment is from −0.10 mm to 0.10 mm. As illustrated in FIG. 28, the curves T and S are respectively the tangential field curvature curve and the sagittal field curvature curve. The field curvature of the sixth exemplary embodiment of the image lens 100 is from −0.20 mm to 0.20 mm. In FIG. 29, the distortion of the sixth exemplary embodiment of the image lens system 100 is from 0 to 3.00%.

Figure 30:
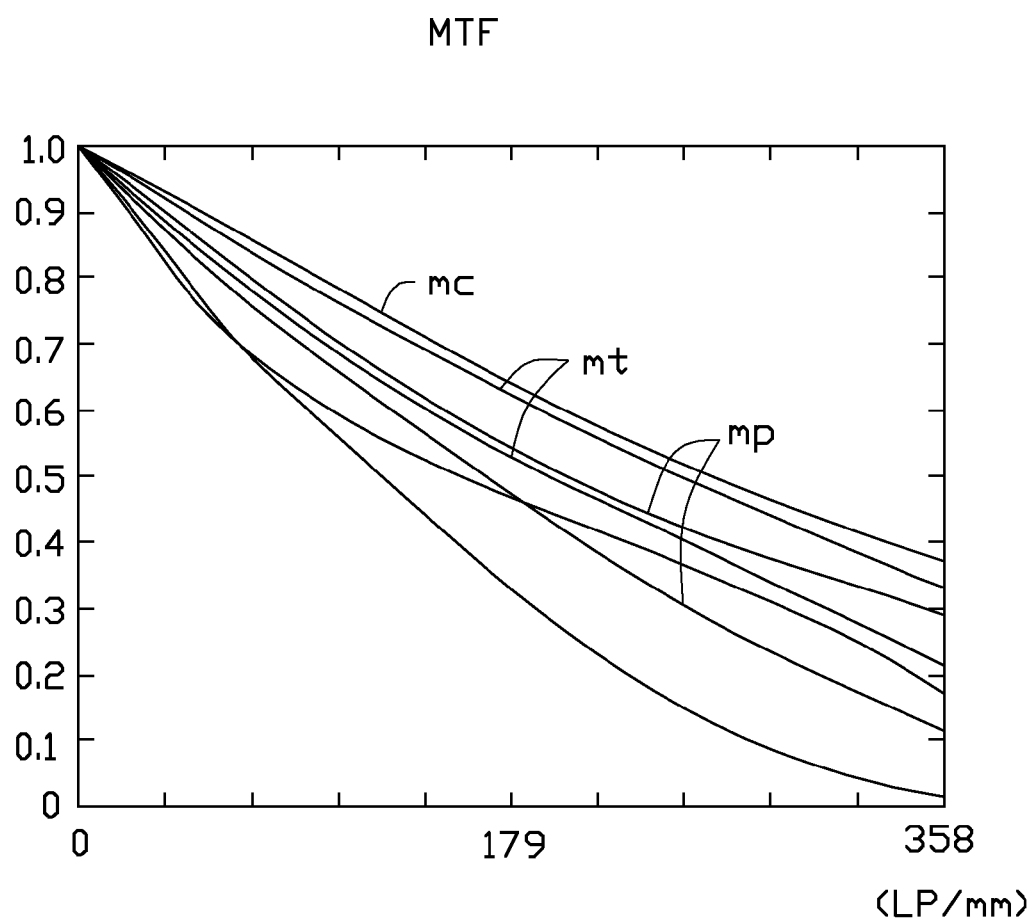
FIG. 30 is a graph showing characteristic curves of modulation transfer mode occurring in the image lens of FIG. 1 in the telephoto mode, according to the sixth embodiment.

FIG. 30 is a graph showing characteristic curves of modulation transfer mode occurring in the image lens 100 in the telephoto mode, according to the sixth exemplary embodiment. As shown in FIG. 30, for half of the Nyquist frequency (about 179 lp/mm), the MTF of the central field is greater than 59% (see curve mc), the MTF of the 0.8 field is greater than 40% (see curve mp), the MTF between the central field and the 0.8 field is in a range of: 40%~59% (see curve mt, for example).

Figure 31:
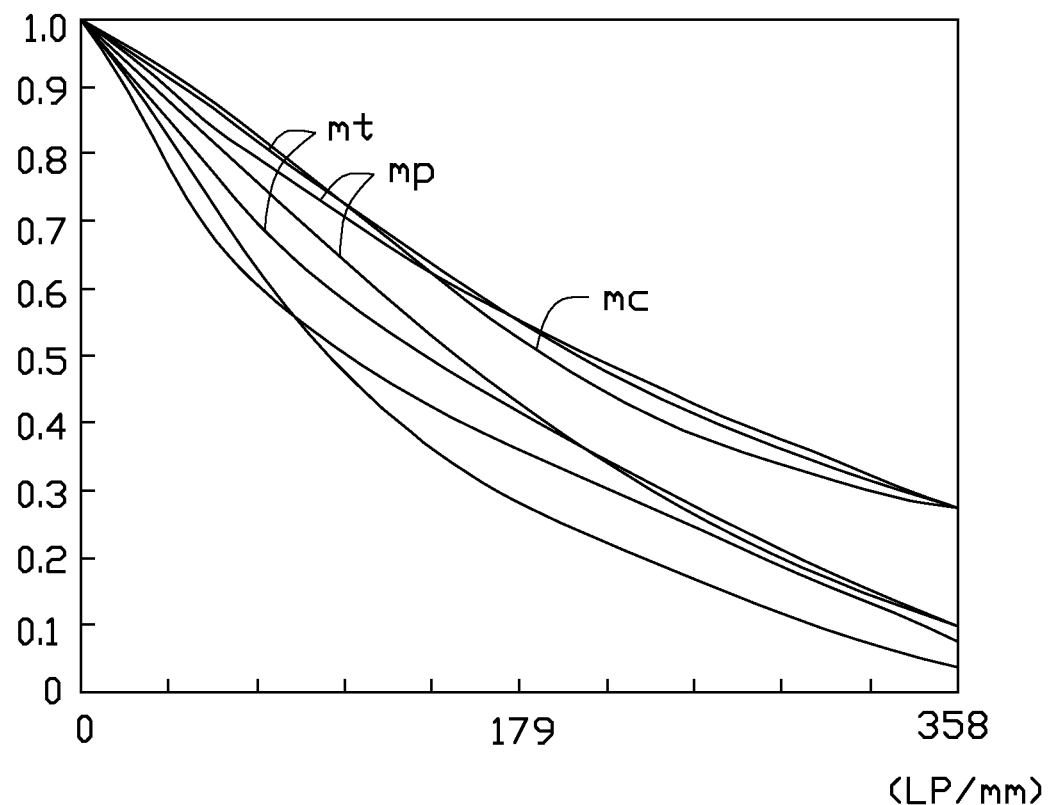
FIG. 31 is a graph showing characteristic curves of modulation transfer mode occurring in the image lens in a wide-angle mode, according to the sixth embodiment.

FIG. 31 is a graph showing characteristic curves of modulation transfer mode occurring in the image lens 100 in the wide-angle mode, according to the sixth exemplary embodiment. As shown in FIG. 31, for half of the Nyquist frequency (about 179 lp/mm), the MTF of the central field is greater than 50% (see curve mc), the MTF of the 0.8 field is greater than 40% (see curve mp), the MTF between the central field and the 0.8 field is in a range of: 40%~50% (see curve mt, for example).

In the embodiments, although the overall length of the image lens 100 is very much reduced, any aberration inherent in the image lens 100 is maintained within an acceptable range. That is, the image lens 100 keeps chromatic aberrations at a minimum whilst reducing the total length of the image lens 100.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. An image lens, in the order from an object side to an image side thereof, comprising:
    a first lens comprising a first surface facing the object side and a second surface facing the image side;
    a second lens comprising a third surface facing the object side and a fourth surface facing the image side;
    a third lens comprising a fifth surface facing the object side and a sixth surface facing the image side;
    a fourth lens comprising a seventh surface facing the object side and an eighth surface facing the image side; and
    an image plane;
    wherein the image lens satisfies the following formulas:

$$D/TTL > 1.11; \quad (1)$$

$$D/L > 1.13; \quad (2)$$

$$Z/Y > 0.076; \quad (3)$$

wherein D is the maximum image diameter of the image plane; TTL is a total length of the image lens; L is a distance from an outmost edge of the eighth surface to an optical axis of the image lens along a direction perpendicular to the optical axis of the image lens; Z is a distance from a central point of the sixth surface to an outmost edge of the sixth surface along the optical axis; Y is a distance from the outmost edge of the sixth surface to the optical axis along a direction perpendicular to the optical axis.

2. The image lens as claimed in claim 1, wherein the first lens has positive refraction power, the first lens satisfies the formulas: $0 < R11/F1 < 0.968$; and $-2.287 < R12/F1 < 0$, wherein R11 is a curvature radius of the first surface of the first lens, R12 is a curvature radius of the second surface of the first lens, F1 is a focal length of the first lens.

3. The image lens as claimed in claim 1, wherein the second lens has negative refraction power, the second lens satisfies the formulas: $-4.074 < R21/F2 < 0$; and $-0.648 < R22/F2 < 0$, wherein R21 is a curvature radius of the third surface of the second lens; R22 is a curvature radius of the fourth surface of the second lens; F2 is a focal length of the second lens.

4. The image lens as claimed in claim 1, wherein the third lens has positive refraction power, the third lens satisfies the formulas: $-7.128 < R31/F3 < 0$; and $-0.615 < R32/F3 < 0$, wherein R31 is a curvature radius of the fifth surface of the third lens, R32 is a curvature radius of the sixth surface of the third lens, F3 is a focal length of the third lens.

5. The image lens as claimed in claim 1, wherein the fourth lens has positive refraction power, the fourth lens satisfies the formulas: $-26.831 < R41/F4 < 14.325$, $-0.695 < R42/F4 < 0$, wherein R41 is a curvature radius of the seventh surface of the fourth lens, R42 is a curvature radius of the eighth surface of the fourth lens, F4 is a focal length of the fourth lens.

6. The image lens as claimed in claim 5, wherein the image lens further satisfies the formula:

$$|R41/F4| > |R42/F4| > 0; \quad (5)$$

wherein R41 is a curvature radius of the seventh surface of the fourth lens; F4 is a focal length of the fourth lens.

7. The image lens as claimed in claim 1, wherein the image lens further satisfies the formula:

$$0 < |R32/F3| < |R42/F4| < |R11/F1|; \quad (4)$$

wherein R11 is a curvature radius of the first surface of the first lens; R32 is a curvature radius of the sixth surface of the third lens; R42 is a curvature radius of the eighth surface of the fourth lens; F1 is a focal length of the first lens, F3 is a focal length of the third lens, and F4 is a focal length of the fourth lens.

8. The image lens as claimed in claim 1, wherein the image lens further satisfies the formula:

$$Vd1 > 53, Vd3 > 53, Vd4 > 53 \text{ and } Vd2 < 33; \quad (6)$$

Wherein Vd1 is the Abbe number of the first lens; Vd2 is the Abbe number of the second lens; Vd3 is the Abbe number of the third lens, and Vd4 is Abbe number of the fourth lens.

9. The image lens as claimed in claim 1, wherein the first, second, third, fourth, fifth, sixth, seventh, and eighth surfaces are all aspherical surfaces.

10. The image lens as claimed in claim 1, wherein the first surface is a convex surface facing the object side, the second surface is a convex surface facing the image side, the third surface is a convex surface facing the object side, and the fourth surface is a concave surface facing the image side, the fifth surface is a concave surface facing the object side, the sixth surface is a convex surface facing the image side, a portion of the seventh surface close to an optical axis of the image lens is concave toward the object-side, and a portion of the eighth surface close to the optical axis of the image lens is concave toward the image-side of the image lens.

11. The image lens as claimed in claim 1, wherein the image lens further comprises an aperture stop positioned on an object side of the first lens.

12. The image lens as claimed in claim 1, further comprising an anti-IR filter, wherein the anti-IR filter is positioned between the fourth lens and the image plane.

* * * * *